US012611801B2

(12) United States Patent
Wang

(10) Patent No.: US 12,611,801 B2
(45) Date of Patent: Apr. 28, 2026

(54) RECYCLING DEVICE AND METHOD FOR LAMINAR STRUCTURES BONDED BY CURED ADHESIVE

(71) Applicant: CHUNG WEI TECHNICAL SERVICE CO., LTD., Tainan City (TW)

(72) Inventor: Chung-Sheng Wang, Tainan City (TW)

(73) Assignee: CHUNG WEI TECHNICAL SERVICE CO., LTD., Tainan City (TW)

( * ) Notice: Subject to any disclaimer, the term of this patent is extended or adjusted under 35 U.S.C. 154(b) by 0 days.

(21) Appl. No.: 18/827,719

(22) Filed: Sep. 7, 2024

(65) Prior Publication Data

US 2025/0121532 A1     Apr. 17, 2025

(30) Foreign Application Priority Data

Oct. 16, 2023   (TW) ................................. 112139386
Nov. 24, 2023   (TW) ................................. 112145467

(51) Int. Cl.
B29B 17/04          (2006.01)

(52) U.S. Cl.
CPC ...... B29B 17/04 (2013.01); B29B 2017/0436 (2013.01); B29B 2017/0496 (2013.01)

(58) Field of Classification Search
CPC ............ B29B 17/04; B29B 2017/0436; B29B 2017/0496; B29B 2017/001; B09B 5/00;
(Continued)

(56) References Cited

U.S. PATENT DOCUMENTS

| | | | | | |
|---|---|---|---|---|---|
| 9,850,433 | B2 * | 12/2017 | Brandhorst, Jr. | ....... | C10B 57/04 |
| 10,640,711 | B2 * | 5/2020 | Brandhorst, Jr. | ....... | C10L 5/447 |

FOREIGN PATENT DOCUMENTS

| | | | | | |
|---|---|---|---|---|---|
| EP | 2984153 | B1 * | 3/2020 | ............... | C22B 7/00 |
| GB | 2522860 | A * | 8/2015 | ............... | B03B 9/06 |

(Continued)

OTHER PUBLICATIONS

CN 115805227 (Year: 2023).*
(Continued)

*Primary Examiner* — Alexander Markoff
(74) *Attorney, Agent, or Firm* — Raymond Sun

(57)          ABSTRACT
A recycling device and a recycling method for laminar structures bonded by cured adhesive are disclosed. The recycling device comprises a barrel device, a molten salt supply equipment and a transfer equipment. The barrel device accommodates the laminar structures. The molten salt supply equipment fills a specially formulated molten salt into the barrel device, and also discharges the molten salt from the barrel device. The transfer equipment transfers the laminar structures between the outside environment, the temperature-adjusting space and the barrel device. Through the design of the barrel device, molten salt supply equipment and transfer equipment, molten salt is used to heat and pyrolyze the solidified adhesive in the laminar structures to obtain recycled plate-like objects with a whole structure, so it can improve the shortcomings of conventional methods for recycling laminar structures such as direct heating pyrolysis, mechanical peeling or scraping.

10 Claims, 17 Drawing Sheets

(58) Field of Classification Search
CPC ......... B09B 3/70; B09B 2101/15; B09B 3/40;
B09B 3/00; B09B 2101/16
See application file for complete search history.

(56) References Cited

FOREIGN PATENT DOCUMENTS

| WO | WO-2014167139 A2 | * | 10/2014 | ............. | F23G 5/033 |
| WO | WO-2022207891 A1 | * | 10/2022 | .............. | C10G 1/10 |

OTHER PUBLICATIONS

CN 114618859 (Year: 2022).*
TW 20102822 (Year: 2010).*
TW M426447 (Year: 2012).*
CH 705803 (Year: 2013).*
CN 101921915 (Year: 2021).*
TW 1377996 (Year: 2012).*
CN 102433441 (Year: 2012).*
CN 104625285 (Year: 2015).*
CN 105543486 (Year: 2016).*
CN 105728434 (Year: 2016).*
CN 106047390 (Year: 2016).*
CN 108754147 (Year: 2018).*
CN 110387472 (Year: 2019).*
CN 112978765 (Year: 2021).*
CN 113560319 (Year: 2021).*
CN 203764635 (Year: 2014).*
CN 215049915 (Year: 2021).*

* cited by examiner

RECYCLING DEVICE AND METHOD FOR LAMINAR STRUCTURES BONDED BY CURED ADHESIVE

BACKGROUND OF INVENTION

1. Field of the Invention

The present invention refers to a recycling device and a recycling method for recycling laminar structures bonded by cured adhesive such like discarded solar cell modules.

2. Description of the Prior Art

Recently, solar power generation has become one of the main renewable energy sources used in various countries. However, solar modules have a certain service life. When a solar cell module loses its power generation function, its self-power generation system must be dismantled. As a result, there are more and more discarded solar cell modules. How to recycle these discarded solar cell modules has become an important current industry issue.

Solar modules generally include key components such as outer frames, glass covers, photovoltaic panels, glue materials, back-plates, and junction boxes. Since the warranty period of solar modules is as long as 25 years, the photovoltaic panels will be very firmly fixed between the glass cover and the backplane using adhesive materials. Therefore, in the process of recycling solar cell modules, how to completely separate and obtain relatively intact glass covers, photovoltaic panels and back-plates has become the biggest challenge. Since the back-plate is usually made of fluorine-containing materials, direct incineration is not environmentally friendly and is not an acceptable treatment method.

At present, in order to disassemble the glass cover and the back-plate of the solar cell module, the mainstream method is mechanical peeling or scraping. However, this method can easily cause the glass cover to break, and in order to deal with the breakage of the glass cover, different improvement methods must be derived. In addition, such method can usually only dismantle and recycle single solar module one by one, and cannot recycle a large number of solar cell modules at the same time. Likewise, similar problems arise in the recycling of other types of cured adhesive-bonded laminar structures.)

China Patent Publication No. CN115805227A case discloses a molten salt recycling equipment for waste circuit boards; Taiwan Utility Model Patent No. TW M426447U discloses a high-temperature liquid inorganic molten salt rapid extraction module device for metal ions; Taiwan Invention Patent Publication No. TW201028224A discloses a reactor device for pyrolyzing circuit boards; China Utility Model Patent No. CN210305002U discloses a smoke treatment device for molten salt furnace. The technologies disclosed in these patent cases all immerse the discarded materials to be recycled into a tank that has been filled with molten salt without preheating the discarded materials. Therefore, they all have the same problems, including: (a) the temperature difference between the discarded materials before and after being immersed in the molten salt is too large and therefore the plate-like materials to be recycled tend to break; (b) when the discarded materials is immersed in the pre-filled molten salt, the buoyancy and surface tension of the molten salt cause the discarded materials to shake and hit, causing them to break or shift; and (c) when the plate-like materials to be recycled are taken out from the molten salt after pyrolyzation process, the plate-like materials still adhere with a lot of molten salt, which solidifies directly on the surface of the plate-like materials after being cooled, causing difficulty in handling. These shortcomings will reduce the efficiency and yield of recycling intact plate-like materials, and thus leaves a room for further improvements.

SUMMARY OF THE INVENTION

Therefore, the objective of the present invention is to provide a recycling device for laminar structures bonded by cured adhesive that can improve at least one shortcoming of the prior arts.

Therefore, the present invention provides a recycling device for laminar structures bonded by cured adhesive. The recycling device comprises a barrel device, a molten salt supply equipment, a transfer equipment furnished in a housing equipment, and a control equipment. The barrel device defines a recycling space for accommodating the laminar structures. The molten salt supply equipment fills a specially formulated molten salt into the barrel device, and also discharges the molten salt from the barrel device. The transfer equipment transfers the laminar structures between the outside environment, a temperature-adjusting space and the barrel device.

In an embodiment, the molten salt supply equipment includes a molten salt container containing the molten salt in a molten state, and a pumping equipment connected between the recycling space of the barrel and the molten salt container. The pumping equipment includes a piping system. When the liquid-level of the molten salt in the recycling space is lower than a predetermined low liquid-level, the transfer equipment moves the holder together with the laminar structures accommodated therein into the recycling space. Then, the piping system is activated to feed the molten salt from the molten salt container into the recycling space, until the laminar structures in the holder are completely submerged in the molten salt, such that the molten salt heats and pyrolyzes the solidified adhesive in the laminar structures. Then, after a predetermined processing time ends, the holder and the laminar structures are still located in the recycling space, and the pumping equipment pumps the molten salt in the recycling space back to the molten salt container, until the liquid-level of the molten salt in the recycling space is lower than the predetermined low liquid-level. Then, when the liquid-level of the molten salt in the recycling space is lower than the predetermined low liquid-level, the transfer equipment moves the holder together with laminar structures out of the recycling space of the barrel.

In an embodiment, the recycling device further includes a housing equipment and a cooling device. The housing equipment includes a housing and a door-unit furnished on the housing. The housing defines a temperature-adjusting space communicating with the recycling space. The door-unit is controlled by the control equipment to switch between a first position that connects the temperature-adjusting space to the outside world and closes the recycling space, and a second position that separates the temperature-adjusting space from the outside world and connects the temperature-adjusting space with the recycling space. The temperature-adjusting space has a first temperature-adjusting zone connected to the outside world, and a second temperature-adjusting zone connected to the first temperature-adjusting zone and the recycling space. The door-unit includes a first door. When the door-unit is in the first position, the first door closes the second temperature-adjusting zone and the recycling space, and allows the first temperature-adjusting zone to communicate with the outside world. When the door-unit is in the second position, the first door blocks the first temperature-adjusting zone from the outside world, and connects the second temperature-adjusting zone with the recycling space.

In an embodiment, when the control equipment performs a recycling function, a preheating procedure, a recycling processing procedure and a cooling procedure will be executed; when the control equipment executes the preheating procedure, the control equipment firstly controls the transfer device to move the holder from the outside world into the first temperature-adjusting zone, then controls the door-unit to switch to the second position, then counts for a preliminary preheating time, then controls the transfer device to move the holder into the second temperature-adjusting zone, and then counts for a high-temperature preheating time; when the control equipment executes the recycling processing procedure, the control equipment controls the transfer device to move the holder into the recycling space; when the control equipment executes the cooling procedure, the control equipment controls the transfer device to move the holder from the recycling space into the second temperature-adjusting zone and stay there for a first cooling time, then controls the transfer device to move the holder into the first temperature-adjusting zone and stay there for a second cooling time, then controls the door-unit to switch to the first position, and then controls the transfer device to move the holder out of the first temperature-adjusting zone.

Another objective of the present invention is to provide a recycling method for laminar structures bonded by cured adhesive that can improve at least one shortcoming of the prior arts.

Therefore, the present invention provides a recycling method for laminar structures bonded by cured adhesive. The recycling method comprises: a step for preparing heat treatment medium, preparing a molten salt with potassium nitrate as main ingredient, then containing the prepared molten salt in a molten salt container, and then using a first heating device to heat the molten salt in the molten salt container to a predetermined melting temperature to make the molten salt melted; a step for preheating, using a control equipment to control a transfer device to move a holder containing a plurality of laminar structures into a temperature-adjusting space for preheating treatment to reduce the temperature difference between the laminar structures and the molten salt; a step for recycling processing, further comprising the following steps: a step for positioning laminar structures; the control equipment controlling the transfer device to move the holder together with the laminar structures into a recycling space of a barrel after the preheating step; at this time, the liquid-level of the molten salt in the barrel is not high enough to soak into a bottom of the laminar structures; a step for filling molten salt; the control equipment controlling a piping system of a pumping equipment to inject the molten salt that has been heated to the predetermined melting temperature from the molten salt container into the recycling space of the barrel, until the liquid-level of the molten salt completely submerges a top of the laminar structures; then, the control equipment controlling a second heating device to heat and maintain the molten salt in the recycling space at a predetermined processing temperature; and a step for molten salt pyrolyzing; the laminar structures being submerged in the molten salt in the recycling space, and allowing an adhesive in the laminar structures to contact the molten salt for a predetermined processing time; such that a plurality of plate-like objects bonded by the adhesive in the laminar structures can be separated to obtained a plurality of recycled products; and a step for outputting recycled objects; after the predetermined processing time is over, the control equipment controlling the pumping equipment to pump the molten salt in the recycling space back to the molten salt container, until the liquid-level of the molten salt in the recycling space is lower than the bottom of the laminar structures; a step for cooling; after the predetermined processing time is over and the liquid-level of the molten salt in the recycling space is lower than the bottom of the laminar structures, the control equipment controlling the transfer device to move the holder together with the recycled products from the recycling space to the temperature-adjusting space for cooling; and a step for unloading; after the cooling step completes, the control equipment controlling the transfer device to move the recycled products out of the temperature-adjusting space.

In an embodiment, the molten salt is prepared by adding an additional pure potassium element to a potassium nitrate molten salt, so that a weight percentage of potassium in the prepared molten salt is higher than that in pure potassium nitrate molten salt; an added amount of the additional pure potassium element is ranged from 5% to 15% based on the weight percentage of the potassium nitrate molten salt, so as to accelerate the lysis process.

BRIEF DESCRIPTION OF THE DRAWINGS

Other features and effects of the present invention will be clearly presented in the embodiments with reference to the drawings, wherein.

DESCRIPTION OF THE PREFERRED EMBODIMENT

Figure 1:
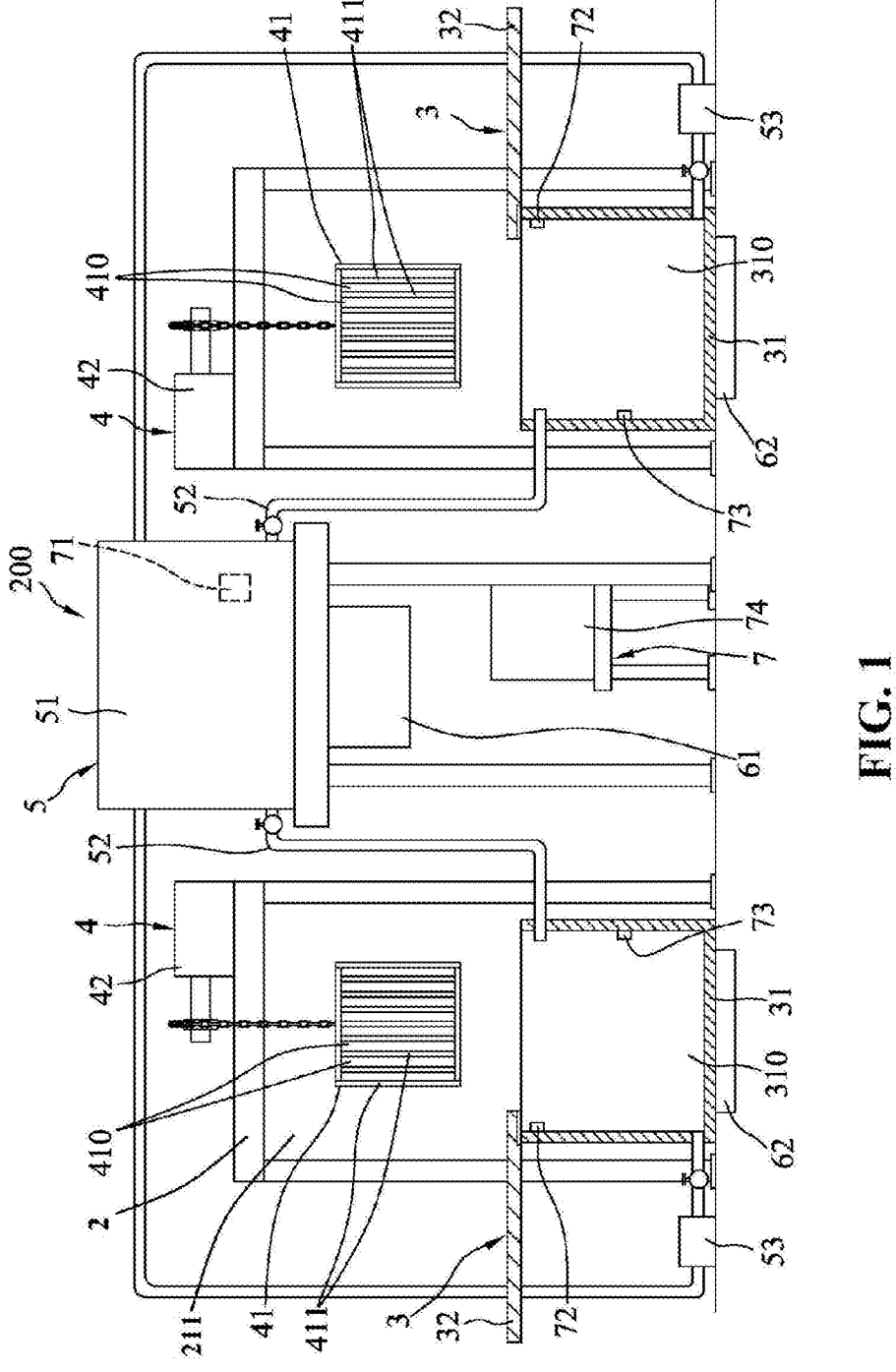
FIG. 1 is a side cross-sectional view of the first embodiment, illustrating the structure of the first embodiment of the recycling device for laminar structures bonded by cured adhesive of the present invention.
Figure 2:
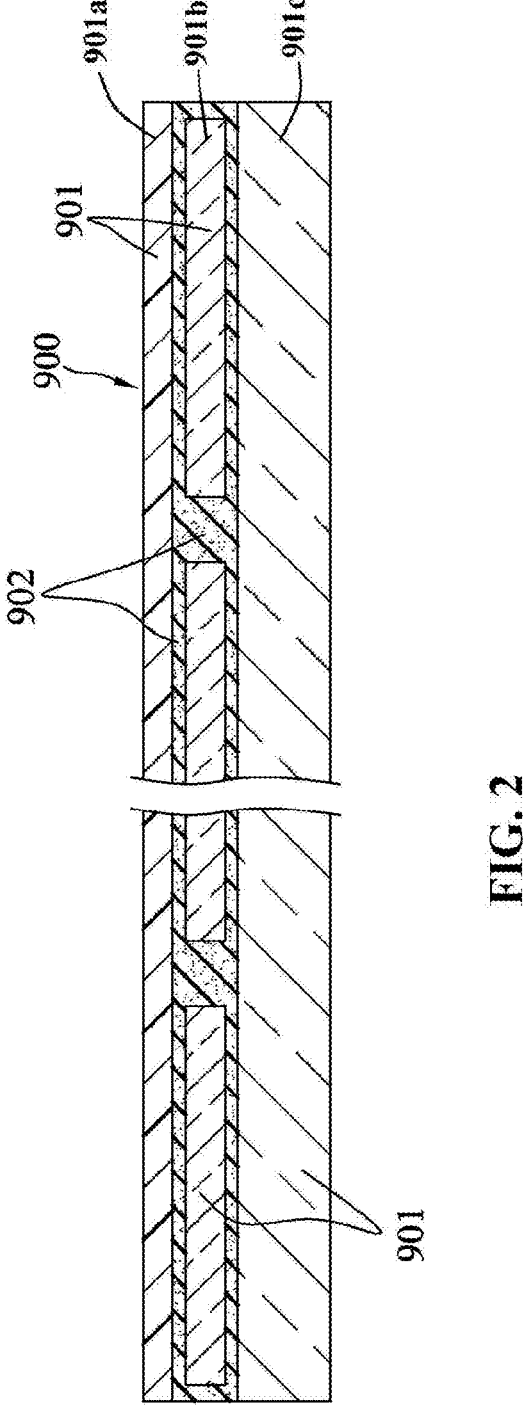
FIG. 2 is an incomplete side cross-sectional view schematically illustrating the structure of the laminar structure to be used for recycling in the first embodiment.
Figure 5:
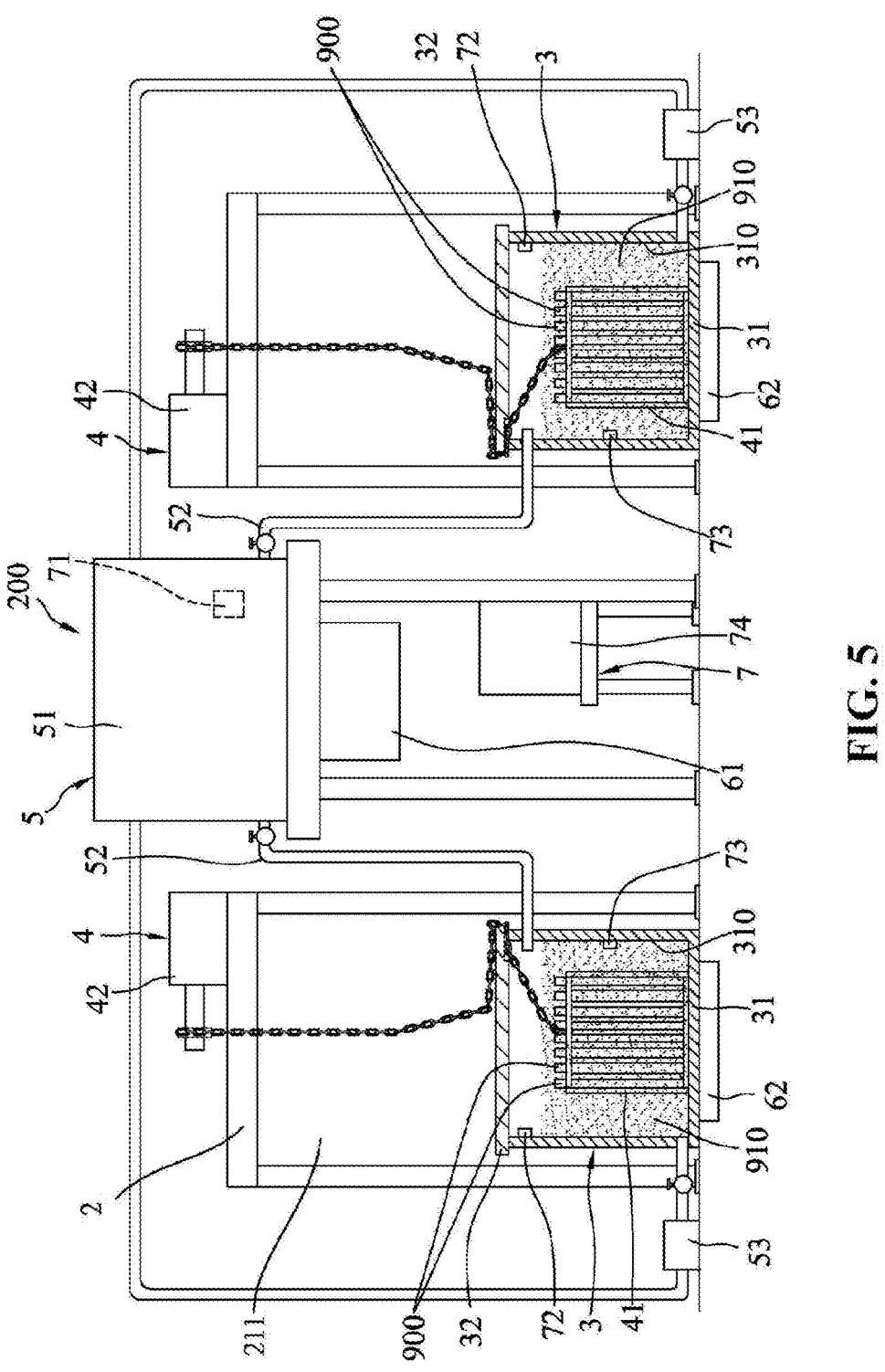
FIG. 5 is a view similar to FIG. 1, schematically illustrating the first embodiment when using molten salt to recycle the laminar structures.

Referring to FIGS. 1, 2, and 5, a first embodiment of a recycling device 200 for laminar structures 900 bonded by cured adhesive according to the present invention is suitable for heating and pyrolyzing the cured adhesive 902 in the laminar structures 900, so that the bonded plate-like objects 901 are separated. In this embodiment, the laminar structure 900 is a solar cell module composed of multiple plate-like objects 901 (including a glass cover 901$a$, a photovoltaic panel 901$b$ and a back-plate 901$c$) bonded and fixed through adhesive 902 such as EVA (ethylene vinyl acetate copolymer), PVB (polyvinyl butyral) or TPU (thermoplastic polyurethane).

The recycling device 200 comprises a housing equipment 2, two barrel devices 3, a molten salt supply equipment 5 connecting to the barrel devices 3 for containing Nitrate to be heated into molten salt 910, a first heating device 61 for heating the molten salt supply equipment 5, a transfer equipment 4 for moving the laminar structures 900 into and out of the barrel devices 3, two second heating devices 62 for heating the barrel devices 3 respectively, and a control equipment 7 which electrically connects with the barrel devices 3, the molten salt supply equipment 5, the first heating device 61, the second heating devices 62 and the transfer equipment 4.

Each barrel device 3 comprises a barrel 31 with a recycling space 310 that opens upward, and a cover 32 (also called as door hereinafter) installed on the top side of the barrel 31 and covering the recycling space 310. The barrel 31 can accommodate the molten salt 910 in the recycling space 310. The cover 32 can be opened and closed controlled by the control equipment 7.

Figure 3:
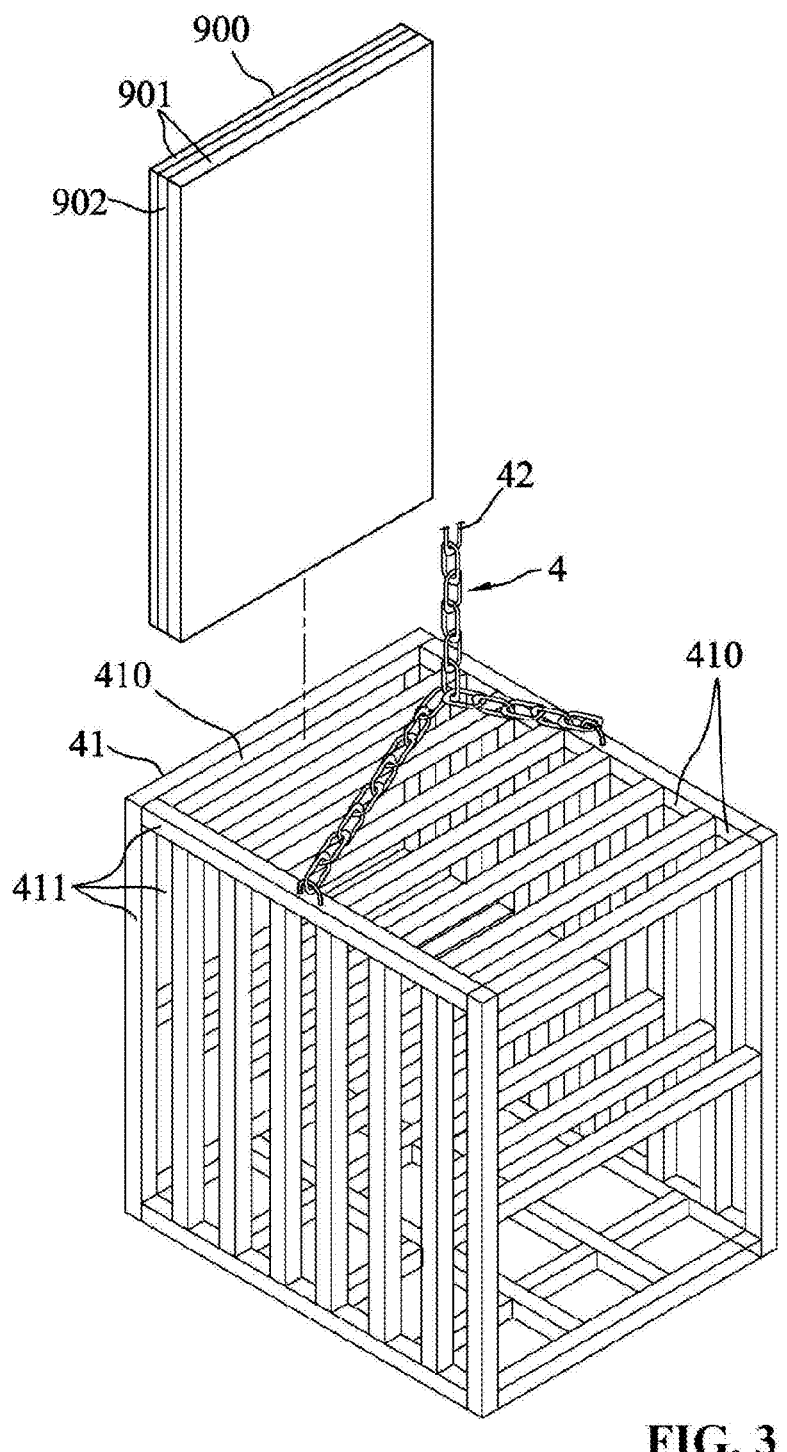
FIG. 3 is an incomplete perspective view illustrating the structure of a holder according to the first embodiment.

Referring to FIGS. 1, 3, and 5, the transfer equipment 4 is installed above the barrel devices 3. Each transfer equipment 4 includes a transfer device 42 arranged above the corresponding barrel device 3, and a holder 41 installed on the transfer device 42 for carrying the laminar structures 900. Each transfer device 42 can be controlled to move the corresponding holder 41 downward into the recycling space 310 of the corresponding barrel 31, and to move the holder 41 upward out of the recycling space 310, and to keep the holder 41 at a position in a temperature-adjusting space 211.

In this embodiment, the transfer device 42 is a hanging device, but in other embodiments of the present invention, it can also be a rail-type transfer device. Since the transfer device 42 is an existing technology and has many types, it will not be described in detail and is not limited to the above embodiments.

The holder 41 is a frame formed by connecting a plurality of rods 411, and has a plurality of compartments 410 for separating and accommodating the laminar structures 900. The holder 41 and the laminar structures 900 contained therein can be moved into the recycling space 310 by the transfer device 42.

The molten salt supply equipment 5 includes a molten salt container 51 containing Nitrate to be heated into molten salt 910, and two pumping equipment 53 connected between the molten salt container 51 and the barrels 31. The pumping equipment 53 includes two piping systems 52 with valve functions that are connected between the molten salt container 51 and the barrels 31. The first heating device 61 heats the molten salt container 51 to heat and melt the Nitrate contained therein into the molten salt 910. The melting point of the Nitrate composing the molten salt 910 is between 200~550° C., such as but not limited to sodium nitrate, potassium nitrate, or mixtures thereof.

Each piping system 52 of the pumping equipment 53 has a first end connected to the bottom of the internal space of the molten salt container 51, and a second end connected to a top of the recycling space 310 of the corresponding barrel 31. Each piping system 52 can be controlled to be opened by the control equipment 7, and the molten salt 910 in the molten salt container 51 can be fed into the recycling space 310 of the corresponding barrel 31.

Each piping system 52 further has a third end connected to a bottom of the recycling space 310 of the barrel 31 and a fourth end connected to a top of the container 51. The pumping equipment 53 can be controlled to pump the molten salt 910 in the recycling space 310 into the molten salt container 51.

The first heating device 61 is equipped on the molten salt container 51 and can be energized to heat the molten salt container 51, so that the Nitrate in the molten salt container 51 are melted into the molten salt 910 and maintained at a predetermined melting temperature. The second heating devices 62 are respectively equipped on the barrels 31. Each second heating device 62 is an electric heating device that can be energized to heat the molten salt 910 in the corresponding barrels 31 and also maintain at a predetermined processing temperature. In other embodiments of the present invention, the first and second heating devices 61, 62 can also be other types of heaters, such as but not limited to: direct-fired heaters, or solar thermal collectors that use sunlight to collect heat for heating, etc.

The control equipment 7 includes a first temperature sensor 71 disposed in the molten salt container 51, two liquid-level sensors 72 respectively disposed in the barrels 31, two second temperature sensors 73 respectively disposed in the barrels 31, and a controller 74 electrically connects with the first temperature sensor 71, the liquid-level sensors 72 and the second temperature sensors 73. The first temperature sensor 71 can sense the temperature of the molten salt 910 in the molten salt container 51. The liquid-level sensor 72 can sense the liquid level (height) of the molten salt 910 in the recycling space 310. Each second temperature sensor 73 can sense the temperature of the molten salt 910 in the recycling space 310.

In this embodiment, the first and second temperature sensors 71, 73 are infrared temperature sensors. However, in other embodiments, other types of temperature sensors may also be used, such as but not limited to thermocouples.

The liquid-level sensors 72 are optical liquid-level sensors in this embodiment. However, in other embodiments, they can also be other types of liquid-level sensors, such as but not limited to: float-type liquid-level sensors, electrical liquid-level sensors that sense impedance changes, sonic liquid-level sensors, and radar waves liquid-level sensors, etc.

The controller 74 also electrically connects with and controls operations of the cover 32, the transfer devices 42, the first heating device 61, the second heating devices 62, the piping systems 52 and the pumping equipment 53.

The controller 74 has a built-in recycling processing procedure. When the recycling process program is activated, the controller 74 controls the transfer devices 42 to transfer and place the holders 41 containing the plurality of laminar structures 900 into the recycling spaces 310 respectively, and also controls the heating device 61 to heat the molten salt 910 in the molten salt container 51 to the predetermined melting temperature. When the transfer device 42 places the holder 41 into the recycling space 310, the recycling space 310 is still empty and the molten salt 910 has not yet been input, or there is only a little bit left molten salt 910 in the recycling space 310 that has not been completely drained. The liquid level of the molten salt 910 left in the recycling space 310 is not high enough to soak into the bottom of the laminar structures 900 contained in the holder 41 at this moment. When the controller 74 determines that the temperature of the molten salt 910 measured by the first temperature sensor 71 has reached the predetermined melting temperature, it controls the piping systems 52 of the pumping equipment 53 to start filling the molten salt 910 contained in the molten salt container 51 into the recycling spaces 310 of the barrels 31 where the holders 41 and the laminar structures 900 are placed. The controller 74 senses the liquid level measured by each liquid-level sensor 72, and when it is determined that the liquid level reaches a predetermined high liquid-level, it will control and close the piping system 52 of the corresponding pumping equipment 53 to stop filling the molten salt 910. And then, the controller 74 controls the cover 32 of the corresponding barrel device 3 to close to seal the recycling spaces 310, thereby reducing the escape of heat energy, and also starts timing a predetermined processing time. The predetermined processing time can be but not limited to: 10 minutes, 20 minutes or 1 hour.

During the period of starting to count the predetermined processing time, the controller 74 will respectively control the second temperature sensors 73 to sense the temperatures of the molten salt 910 in the barrels 31, and also controls the second heating devices 62 based on the temperatures sensed to heat and maintain the molten salt 910 in the barrels 31 at the predetermined processing temperature.

After the predetermined processing time of the barrels 31 have expired, the controller 74 controls the pumping equipment 53 to pump the molten salt 910 in the recycling spaces 310 back to the molten salt container 51. At this time, the holders 41 and the laminar structures 900 are still located in the barrels 31. The controller 74 will control and deactivate the pumping equipment 53 when it determines that the liquid levels measured by the liquid-level sensors 72 drop to a predetermined low liquid-level. The controller 74 then controls the covers 32 to open and controls the transfer devices 42 to move the holders 41 together with the processed laminar structures 900 out of the recycling spaces 310, and thereby completes the recycling processing procedure.

In this embodiment, two barrel devices 3 and two transfer devices 42 are used as examples for explanation, but the number is not limited to this during implementation. The number of the barrel device 3 and the transfer equipment 4 can be increased or decreased according to needs.

In other embodiments described below, most of the structures, connection relationships and functions of the components included in the recycling device 200 are the same or similar to the first embodiment. Therefore, in the following descriptions and drawings, components with the same structure and function will be directly given the same component names and numbers, and their details will not be described again.

Figure 4:
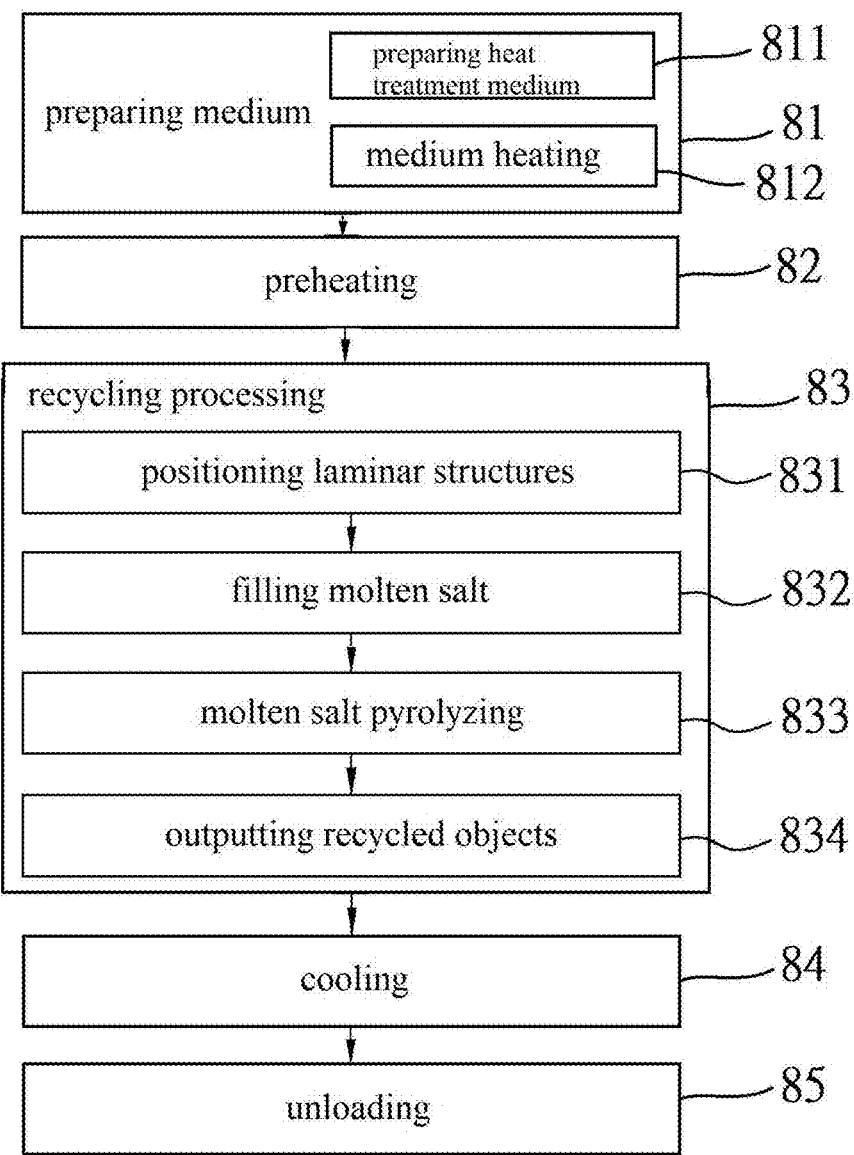
FIG. 4 is a flow chart illustrating the process of a recycling method for laminar structures bonded by cured adhesive implemented in the second embodiment of the present invention.
Figure 6:
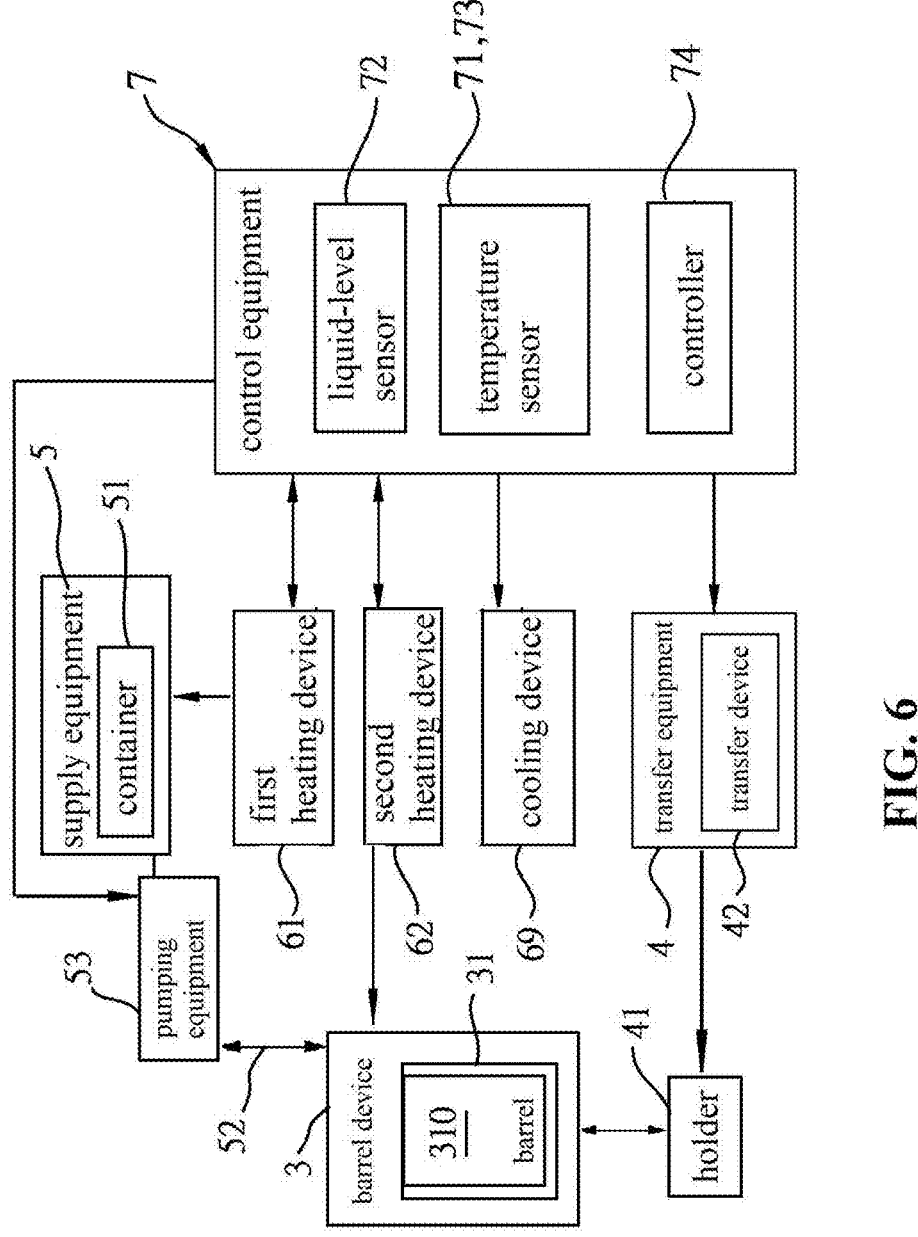
FIG. 6 is a functional block diagram illustrating the functional architecture of the second embodiment.
Figure 7:
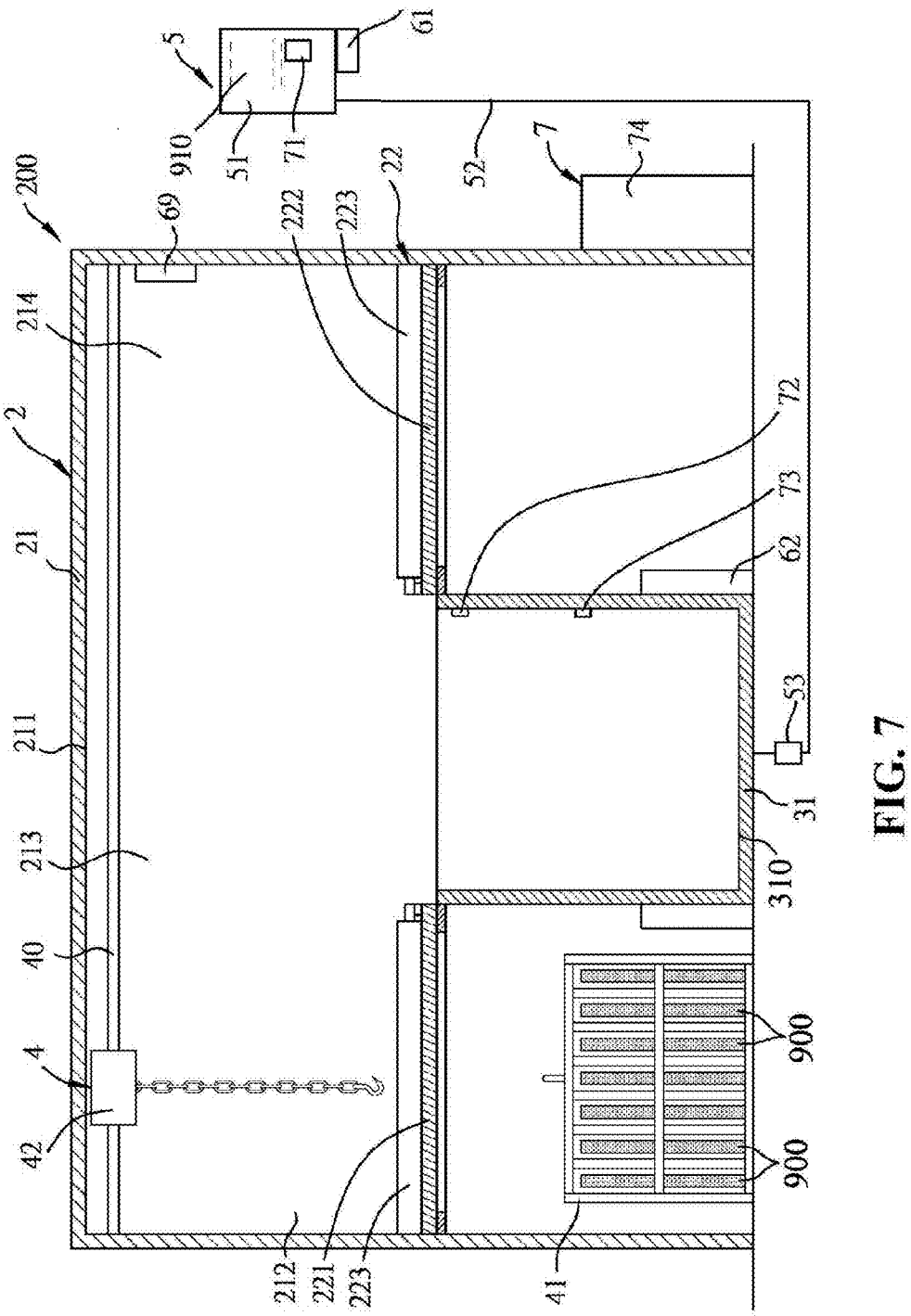
FIG. 7 is a side cross-sectional view schematically illustrating the structure of the second embodiment of the recycling device for laminar structures bonded by cured adhesive of the present invention.
Figure 15:
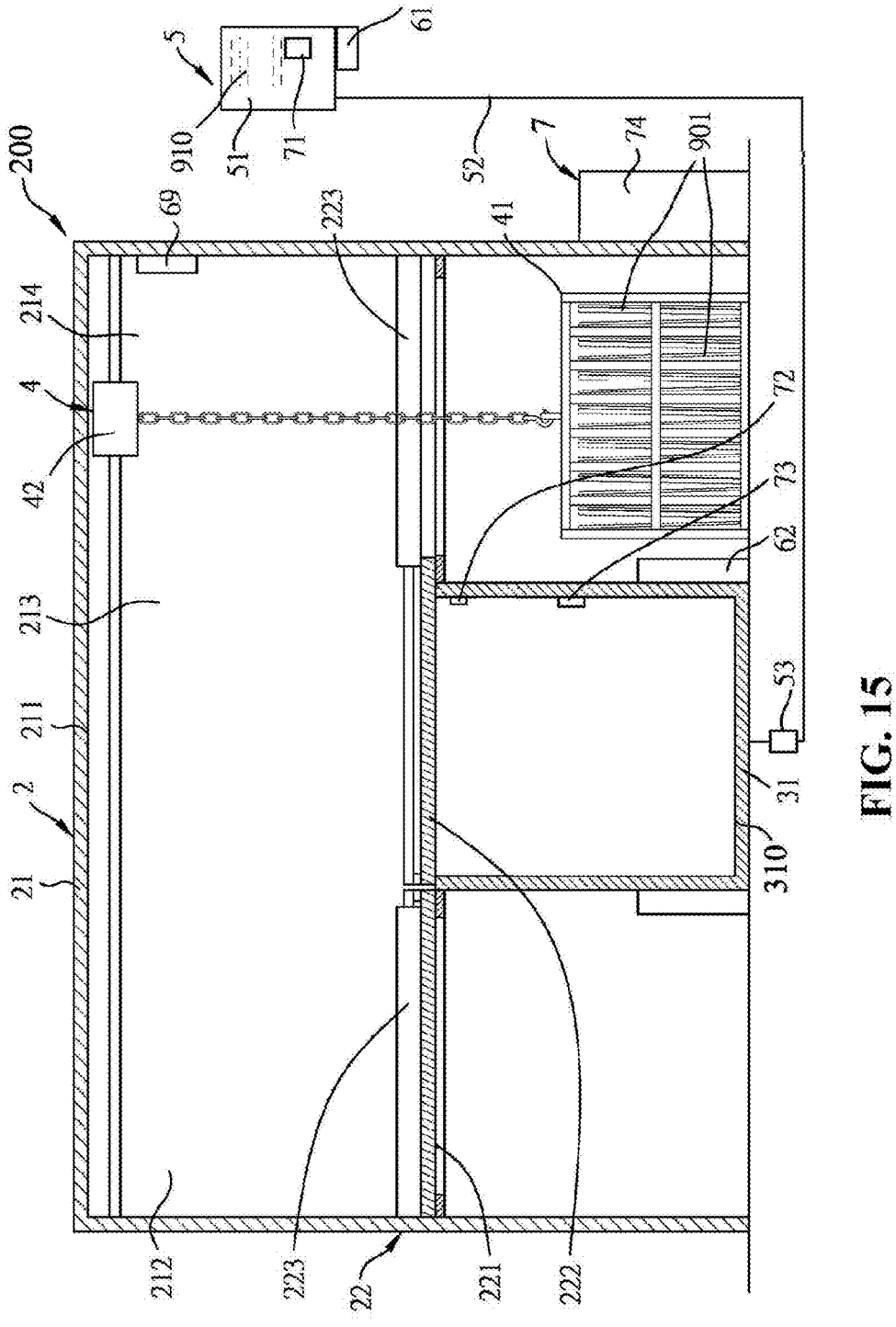
FIG. 15 is a view similar to FIG. 7, illustrating the situation when the holder is moved out of the third temperature-adjusting zone.

Referring to FIGS. 4, 6, and 7, the second embodiment of the recycling device 200 for laminar structures bonded by cured adhesive of the present invention is suitable for using the melted molten salt 910 to heat and pyrolyze the solidified adhesives in the laminar structures 900 in order to separate the bonded plate-like objects 901 (shown in FIG. 15).

The second embodiment of the recycling device 200 comprises a housing equipment 2, a barrel device 3 having at least one barrel 31, a molten salt supply equipment 5 connecting to the barrel device 3 for containing a melted molten salt 910, a first heating device 61 provided in the molten salt supply equipment 5, at least one second heating device 62 provided in the at least one barrel 31, a cooling device 69, at least one transfer equipment 4, and a control equipment 7. The control equipment 7 is electrically connected with the housing equipment 2, the barrel device 3, the molten salt supply equipment 5, the first heating device 61, the second heating device 62, the cooling device 69 and the transfer equipment 4. The molten salt supply equipment 5 includes a molten salt container 51 and a pumping equipment 53 (including piping system 52). The control equipment 7 includes a first temperature sensor 71, a liquid-level sensor 72, a second temperature sensor 73, and a controller 74. Since the structures, connection relationships and functions of the above-mentioned components of the second embodiment of the recycling device 200 are the same or similar as those of the first embodiment, their details will not be described again.

The housing equipment 2 includes a housing 21 and a door-unit 22 installed in the housing 21. The interior of the housing 21 defines a temperature-adjusting space 211 and a recycling space 310 for receiving the molten salt 910 supplied by the molten salt supply equipment 5. The temperature-adjusting space 211 includes a first temperature-adjusting zone 212, a second temperature-adjusting zone 213 and a third temperature-adjusting zone 214 that are laterally connected in sequence. The recycling space 310 is located below the second temperature-adjusting space 213.

Figure 14:
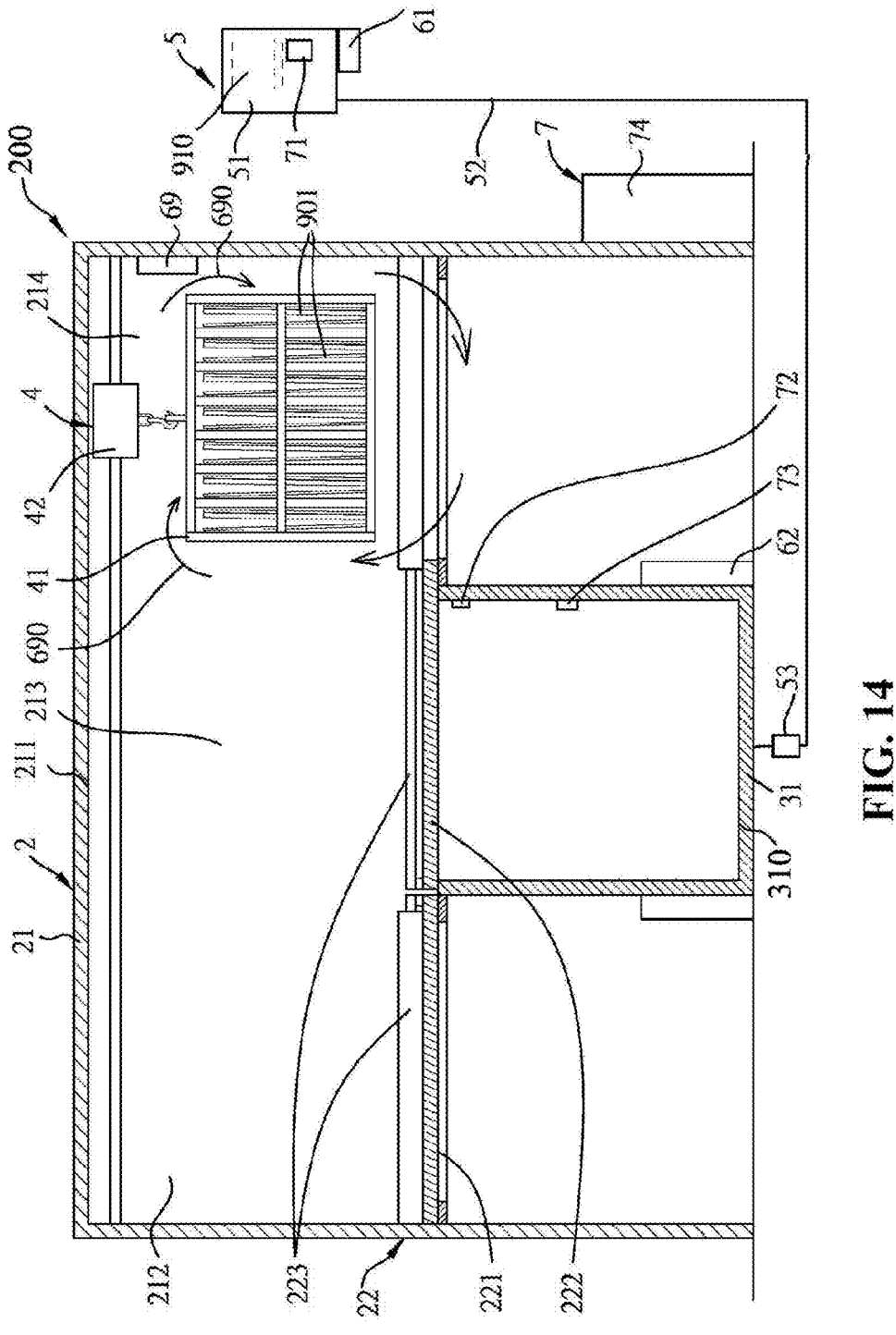
FIG. 14 is a view similar to FIG. 7, illustrating the situation when the door-unit is driven to the third position and the third temperature-adjusting zone is connected to the outside environment.

Referring to FIGS. 6, 7, and 14, the door-unit 22 is located in the housing 21 and includes a first door 221, a second door 222 spaced apart from the first door 221, and two drivers 223 for driving and moving the first and second doors 221, 222 respectively. The first driver 223 can be controlled to move the corresponding first door 221 between a first position of blocking the second temperature-adjusting zone 213 from the recycling space 310, and a second position of blocking the first temperature-adjusting zone 212 from the outside world. The second driver 223 can be controlled to move the corresponding second door 222 between the second position of blocking the third temperature-adjusting zone 214 from the outside world, and a third position of blocking the second temperature-adjusting zone 213 from the recycling space 310. Thus, the door-unit 22 can change between the first position, the second position and the third position relative to the housing 21.

In this second embodiment, the drivers 223 are telescopic cylinders that can telescopically drive the first and second doors 221, 222 to move relative to the housing 21. However, in other embodiments, the drivers 223 may also be motor transmission devices. Since there are many types of drivers that can be used to control the opening/closing of the door, the drivers 223 are not limited to the above-mentioned forms.

Figure 8:
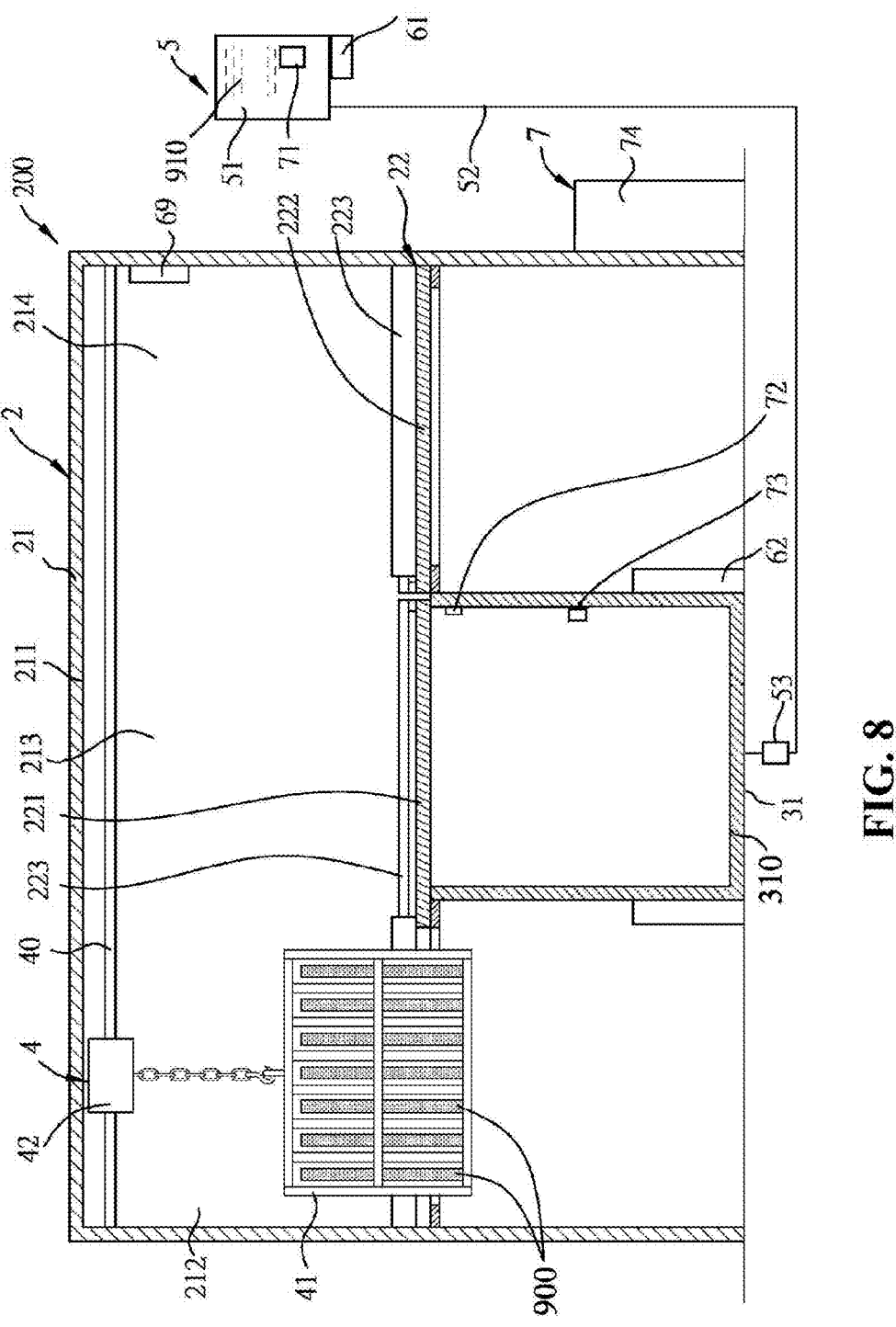
FIG. 8 is a view similar to FIG. 7, illustrating the situation when a door-unit changes to the first position and a holder is moved to a first temperature-adjusting zone.
Figure 9:
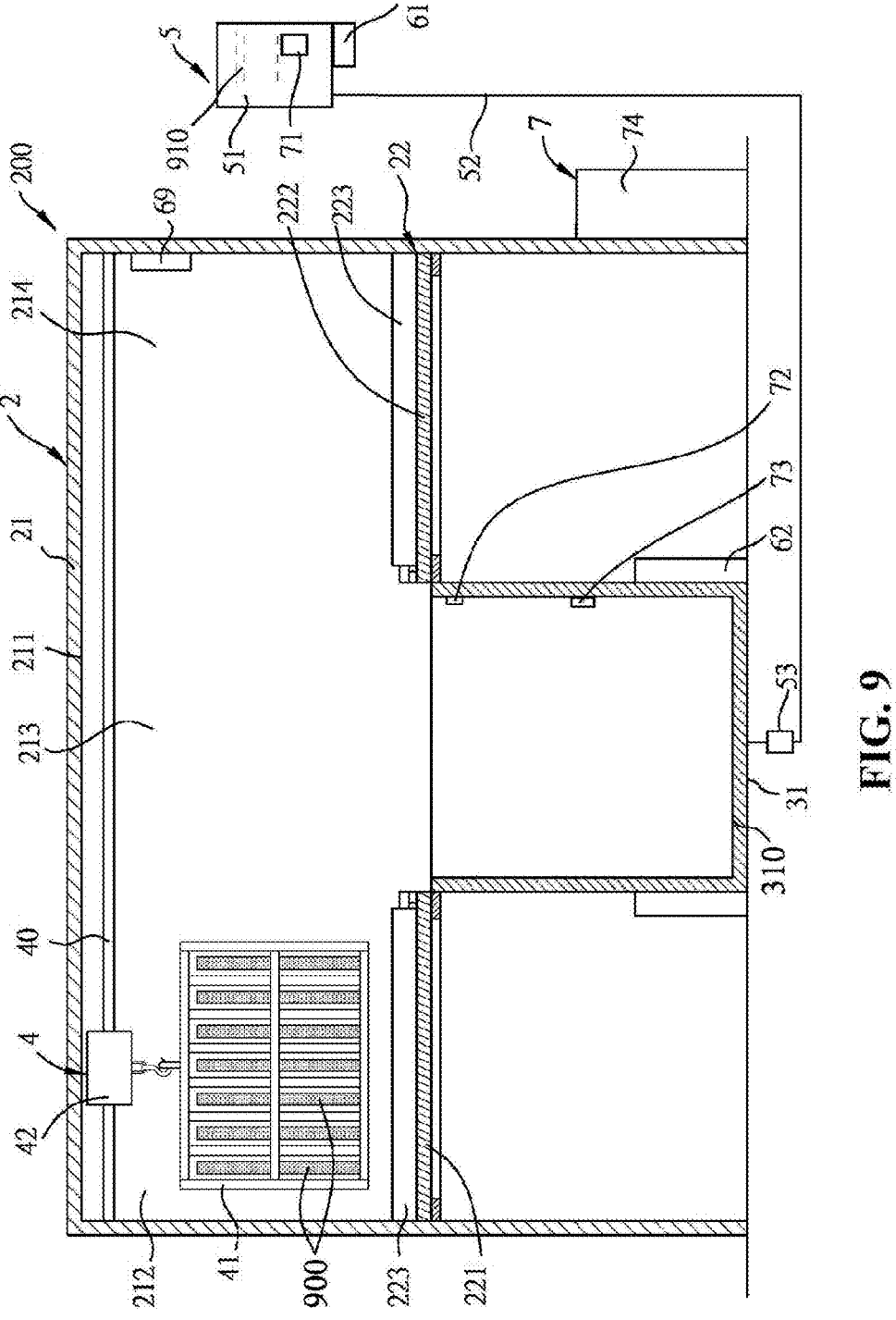
FIG. 9 is a view similar to FIG. 7, illustrating the situation when the holder is moved into the first temperature-adjusting zone and the door-unit changes to the second position.
Figure 10:
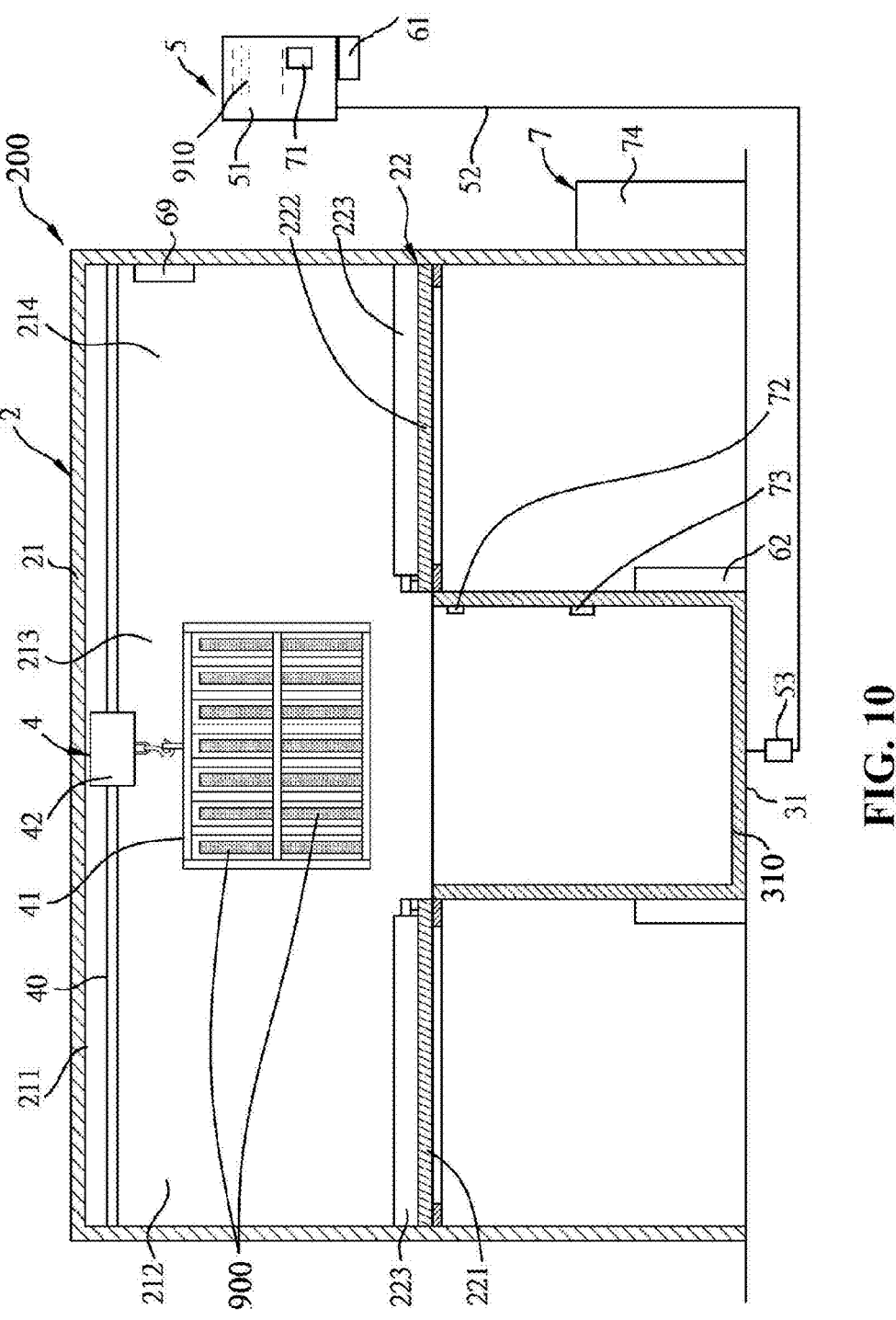
FIG. 10 is a view similar to FIG. 7, illustrating the situation when the holder is moved to the second temperature-adjusting zone.

When the door-unit 22 is in the first position (as shown in FIG. 8), the first temperature-adjusting zone 212 is connected to the outside world, and the first door 221 seals and separates the temperature-adjusting zone 213 from the recycling space 310, and the second door 222 seals and separates the third temperature-adjusting zone 214 from the outside world. When the door-unit 22 is in the second position (as shown in FIGS. 7 and 10), the first door 221 seals and separates the first temperature-adjusting zone 212 from the outside world, and the second door 222 seals and separates the third temperature-adjusting zone 214 from the outside world, and the second temperature-adjusting zone 213 is connected with the recycling space 310. When the door-unit 22 is in the third position (as shown in FIG. 14), the first door 221 seals and separates the first temperature-adjusting zone 212 from the outside world, and the second door 222 seals and separates the second temperature-adjusting zone 213 from the recycling space 310, and the third temperature-adjusting zone 214 is connected with the outside world. When the door-unit 22 is located in the second position, the heat generated by the second heating device 62 or/and the heat of the molten salt 910 in the recycling space 310 will spread upward into the temperature-adjusting space 211; such that the ambient temperature of the second temperature-adjusting zone 213 is relatively higher than the ambient temperatures of the first temperature-adjusting zone 212 and the third temperature-adjusting zone 214. In this embodiment, the temperature of the first temperature-adjusting zone 212 is maintained between 100~200° C., the temperature of the second temperature-adjusting zone 213 is maintained between 200~350° C., the temperature of the third temperature-adjusting zone 214 is below 200° C., and temperature of the molten salt in the barrel 31 is maintained at a relatively high temperature between 300~550° C. by the second heating device 62.

The second heating device 62 is controlled by the control equipment 7, and can not only heat the molten salt 910 contained in the recycling space 310, but also can heat the empty barrel 31 (or there is only a little bit of molten salt 910 left in the barrel 31 that the liquid-level of molten salt 910 is not high enough to soak into the bottom of the laminar structures 900) to achieve the function of increasing or maintaining the temperature the second temperature-adjusting zone 213.

The cooling device 69 is controlled by the control equipment 7 to generate a cooling airflow 690 in the third temperature-adjusting zone 214 to cool down the items located therein. In this embodiment, the cooling device 69 is an electric fan, but in another embodiment, it can also be an air conditioning device using refrigerant.

The transfer equipment 4 includes: a rail unit 40 laterally extending in the housing 21, a transfer device 42 installed on and movable along the rail unit 40, and a holder 41 connected on the transfer device 42 in a detachable manner for accommodating a plurality of the laminar structures 900.

In this embodiment, the rail unit 40 extends laterally across the first, second and third temperature-adjusting zones 212, 213, 214. The transfer device 42 is a hanging device that can hang up and down to transfer the holder 41, and can transfer the holder 41 between the zones 212, 213, 214 along the rail unit 40. An embodiment of the holder 41 is shown in FIG. 3.

In other embodiments of the present invention, the rail unit 40 can also be designed to extend between the outside world and the first temperature-adjusting zone 212, between the second temperature-adjusting zone 213 and the recycling space 310, and between the third temperature-adjusting zone 214 and the outside world. In addition, the transfer device 42 is designed to be a rail-typed transfer device for transferring the holder 41 between those zones 212, 213, 214 and the recycling space along the rail unit 40.

Referring to FIGS. 6 and 7, the control equipment 7 includes: a plurality of temperature sensors 71, 73 for measuring the temperature of the molten salt 910 in the molten salt container 51 and the recycling space 310, a liquid-level sensor 72, and a controller 74 electrically connecting with the sensors 71, 72, 73. The controller 74 can perform a built-in recycling function. When the recycling function is activated, a medium heating procedure, a pre-heating procedure, a recycling processing procedure and a cooling procedure will be continuously executed, so that the laminar structures 900 can be recycled by the recycling device 200. The procedures for this recycling function will be illustrated later.

Referring to FIGS. 4, 6 and 7, when the recycling device 200 of the present invention is used to recycle the laminar structures 900, the holder 41 will first be placed under the first temperature-adjusting zone 212, and the laminar structures 900 to be recycled will be placed in the holder 41. Then, the recycling operation is started. The recycling method of the recycling device 200 for recycling the laminar structures 900 includes the following steps:

Step 81: preparing heat treatment medium. First, the formula of the heat treatment medium needs to be prepared (step 811). In the present invention, the heat treatment medium contains molten salt 910 with potassium nitrate as the main component. In a preferred embodiment, the formula preparation step 811 of step 81 is to add additional pure potassium element to the potassium nitrate molten salt so that the weight percentage of potassium in the prepared molten salt 910 formula is higher than that in pure potassium nitrate molten salt. Since the potassium ions will interact with the glass in the laminar structure 900 to enhance the replacement reaction of potassium ions and sodium ions, the concentration of potassium ions in the glass will increase, causing the surface hardness of the glass to increase. By adding additional pure potassium element to the molten salt containing potassium nitrate as the main component, the potassium ion concentration of the prepared molten salt formula is increased, and the glass surface becomes hardened, making it easier to produce cracks due to temperature changes, thereby facilitating the glass to break or burst, so as to speed up the pyrolyzation process during recycling processing procedure. In this embodiment, the applicable range of added amount of the additional pure potassium element is 0.1% to 20% based on the weight percentage of the molten salt containing potassium nitrate as the main component. However, in the best embodiment of the present invention, the optimal range of added amount of the additional pure potassium element is 5% to 15% based on the weight percentage of the molten salt containing potassium nitrate as the main component. Specifically, the relative molecular mass of potassium nitrate ($KNO_3$) is 101.087, and its composition ratio is 38.67% potassium, 13.86% nitrogen, and 47.47% oxygen. By adding the additional 5% to 15% by weight percentage of pure potassium element to the potassium nitrate molten salt, the proportion of potassium in the prepared molten salt formula can be increased to 41.6% to 46.68%. This optimal range can maximize the acceleration of the lysis process and shorten the processing time. In another embodiment, the formula preparation step 811 of step 81 is to add additional sodium nitrate to the potassium nitrate molten salt so that the weight percentage of sodium ion in the prepared molten salt 910 formula is increased. Because there will be no replacement reaction between the sodium ions in sodium nitrate and the sodium ions in the glass in the laminar structure 900, during the pyrolyzation process of the recycling processing procedure, when the adhesive layer colloid loses its viscosity, the glass in the laminar structure 900 maintains its surface hardness or gently reduces its glass strength. It is beneficial for peeling off each layer of the plate-like objects to be recycled and maintaining the integrity of the plate-like objects such like glass cover, back-plate, and photovoltaic panel as much as possible. In this embodiment, the applicable range of added amount of the additional sodium nitrate is 0.1% to 20% based on the weight percentage of the molten salt containing potassium nitrate as the main component. However, in the best embodiment of the present invention, the optimal range of added amount of the additional sodium nitrate is 5% to 15% based on the weight percentage of the molten salt containing potassium nitrate as the main component. Within this optimal range, the integrity of plate-like objects such as glass covers, back-plates, and photovoltaic panels obtained after the recycling processing procedure can be maintained to the maximum degree.

That is, when the goal of the recycling method of the present invention is to accelerate the lysis process and shorten the processing time of the recycling processing procedure as much as possible, the formula preparation step 811 is to add additional pure potassium element to the potassium nitrate molten salt. The added additional pure potassium element should reach 5%~15% by weight percentage of the potassium nitrate molten salt, in order to improve the lysis efficiency. On the other hand, when the goal of the recycling method is to maintain the integrity of the plate-like objects such as glass covers, back-plates and photovoltaic panels obtained after the recycling processing procedure, the formula preparation step 811 is to add additional sodium nitrate to the potassium nitrate molten salt. The added additional sodium nitrate should reach 5%~15% by weight percentage of the potassium nitrate molten salt, in order to maintain the integrity of the recycled glass covers, back-plates and photovoltaic panels.

The prepared molten salt 910 is stored in the molten salt container 51. Then, the controller 74 activates the recycling function and starts executing the medium heating step 812. The controller 74 controls the door-unit 22 to switch to the second position, so that the temperature-adjusting space 211 and the recycling space 310 are completely separated from the outside world, and the recycling space 310 is connected to the temperature-adjusting space 211. During the medium heating step 812, the controller 74 correspondingly controls the operations of the first heating device 61 and the second heating device 62 according to the temperatures measured by the temperature sensors 71 and 73. Thereby, the first heating device 61 heats the molten salt 910 in the molten salt container 51 to a predetermined melting temperature to a fluid state. In addition, the second heating device 62 heats the barrel 31 to maintain it at the predetermined processing temperature; wherein, at this time, the barrel 31 is still empty or there is only a little bit of molten salt 910 left in the barrel 31 that has not been drained out and the liquid-level is not high enough to soak into the bottom of the laminar structures 900.

At this time, the heat generated by the second heating device 62 for barrel 31 and/or the heat of the molten salt 910 in the recycling space 310 will spread upward into the connected temperature-adjusting space 211. The second temperature-adjusting zone 213 connected directly above the recycling space 310 has the highest ambient temperature, and the ambient temperatures of the first and third temperature-adjusting zones 212, 214 connected to two sides of the second temperature-adjusting zone 213 are relatively lower than the ambient temperatures of the second temperature-adjusting zone 213.

Step 82: preheating step. Referring to FIGS. 4, 6, 8 and 9, the controller 74 executes a preheating procedure in this step 82. First, the controller 74 controls the door-unit 22 to switch from the second position to the first position so that the first temperature-adjusting zone 212 is connected to the outside world. Then, the controller 74 controls the transfer device 42 to hang the holder 41 upward and move it into the first temperature-adjusting zone 212, and controls the door-unit 22 to switch to the second position to seal the first temperature-adjusting zone 212 from the outside world, and thereby starts preheating the laminar structures 900 carried by the holder 41.

During the preheating procedure, the controller 74 first controls the transfer device 42 to hold the holder 41 to stay in the first temperature-adjusting zone 212 for a preliminary preheating time. During this preliminary preheating time, the thermal energy spread to the first temperature-adjusting zone 212 performs preliminary preheating treatment on the laminar structures 900 in the holder 41 to increase the temperature of the laminar structures 900. Then, the controller 74 controls the transfer device 42 to transfer the holder 41 to the second temperature-adjusting zone 213 and stay there for a high-temperature preheating time. During this high-temperature preheating time, the thermal energy in the second temperature-adjusting zone 213 with a relatively higher ambient temperature further increases the temperature of the laminar structures 900 and thus reduces the temperature difference between the laminar structures 900 and the molten salt 910.

Figure 11:
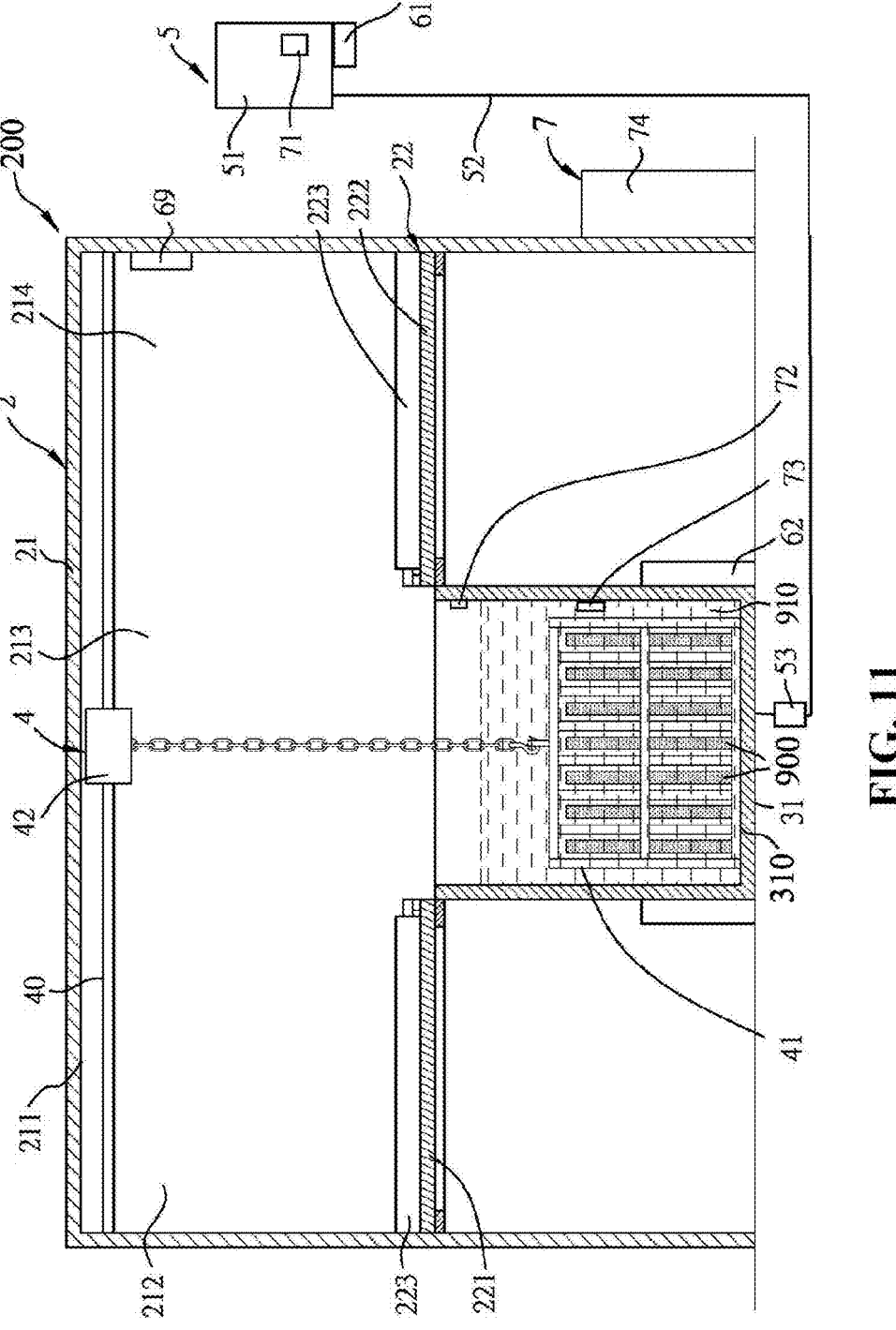
FIG. 11 is a view similar to FIG. 7, illustrating the situation when the holder is moved into the recycling space and the laminar structures carried therein are contacted with molten salt.

Step 83: recycling processing. Referring to FIGS. 4, 6, and 11, after completing the aforementioned preheating step 82, the controller 74 executes the recycling processing procedure. The controller 74 firstly controls the transfer device 42 to move the holder 41 downward into the empty recycling space 310, and then controls piping system 52 to feed the molten salt 910 from the molten salt container 51 into the recycling space 310 of the barrel 31, until the laminar structures 900 in the holder 41 are completely submerged in the molten salt 910. Then, the holder 41 stays in the recycling space 310 for a predetermined processing time. Of course, during and after the molten salt 910 is fed into the recycling space 310, the second heating device 62 continues to heat the fluid molten salt 910 contained in the recycling space 310 to maintain it at the predetermined processing temperature. In this embodiment, the recycling processing step 83 further includes steps 831 to 834.

Step 831: positioning laminar structures. The control equipment 7 controls each transfer device 42 to transfer the corresponding holder 41 into the recycling space 310 of the corresponding barrel 31. The laminar structures 900 to be recycled are respectively placed in the compartments 410 of each holder 41. At this time, the barrel 31 is either empty without any molten salt 910 being injected, or there is only a little molten salt 910 left in the barrel 31 that has not been completely discharged, and the liquid-level of the molten salt 910 is not high enough to soak into the bottom of the laminar structures 900.

Step 832: filling molten salt. When the controller 74 controls the first heating device 61 to heat the molten salt 910 in the molten salt container 51 to the predetermined melting temperature, it controls the piping system 52 of the pumping equipment 53 to fill the molten salt 910 into the recycling spaces 310. When the controller 74 determines that the sensing results of the liquid-level sensors 72 represent that the molten salt 910 have reached the predetermined high liquid-level, that is, when the liquid-level of the molten salt 910 has completely submerged the top of the laminar structures 900, it controls to close the piping system 52. The predetermined melting temperature ranges from 200~550° C.

The reason why the recycling device of the present invention must first put the laminar structures 900 to be recycled into the empty barrel 31 before injecting the molten salt 910 is because that, if the barrel 31 is already prefilled with liquid molten salt before putting in the laminar structures, there will be strong buoyancy tension on the surface of the molten salt. Because the holder 41 and the laminar structures 900 are very heavy, when the bottom of the holder 41 and the laminar structures 900 therein contact the molten salt surface and are about to break through the resistance of the buoyancy tension on the surface of the molten salt and enter the liquid molten salt, the gravity of the holder 41 and the laminar structures 900 therein and the buoyancy tension of the molten salt surface will disturb and interfere with each other, causing the holder 41 and the laminar structures 900 therein to shake vertically or horizontally in an abnormal manner, and thus risking the process. Stability cannot be restored until the holder 41 and the laminar structures 900 are almost completely submerged by the molten salt. Therefore, in order to avoid the aforementioned risk of disturbance and abnormal shaking of the laminar structures 900 due to the surface tension and buoyancy of the molten salt, the recycling device of the present invention specifically includes the molten salt container 51, the piping system 52 and the first heating device 61 that is independent of the second heating device 62 and the barrel 31. Furthermore, during the recycling processing step 83, the holder 41 and the laminar structures 900 are first put into the empty barrel 31, and then the liquid molten salt heated to a predetermined melting temperature by the first heating device 61 is injected into the barrel 31 through the molten salt container 51 and the piping system 52, so as to eliminate the risk of disturbance and shaking.

Step 833: molten salt pyrolyzing. The controller 74 closes the piping system 52 of the pumping equipment, and then controls the door (cover 32 shown in FIG. 5) to close to seal the recycling space 310, and starts timing the predetermined processing time. In the meantime, the controller 74 activates the second heating device 62 to heat and maintain the molten salt 910 in the barrel 31 at the predetermined processing temperature. The applicable range of the predetermined processing temperature is between 200~550° C., and the preferred range is between 300~550° C.

During the timing of the predetermined processing time of the molten salt pyrolyzing step 833, the laminar structures are completely submerged in the molten salt in the recycling space, and the solidified adhesives in the laminar structures

900 come into contact with the molten salt 910. The molten salt 910 heat and pyrolyzes the solidified adhesives in each laminar structures 900, thereby separating each plate-like objects 901 adhered by the adhesives 902, and thus obtaining the recycled plate-like objects. Wherein FIG. 2 shows the structure of the laminar structure 900.

Step 834: outputting recycled objects. After the predetermined processing time ends, the control equipment 7 controls the pumping equipment 53 to pump the molten salt 910 in the recycling space 310 back to the molten salt container 51. When the controller 74 determines that the sensing results of the liquid-level sensor 72 represents that the molten salt 910 has reached the predetermined low liquid-level, that is, when the liquid-level of the molten salt 910 in the recycling space 310 (in the barrel 31) is lower than the bottom of the laminar structures 900, the controller 74 controls the door 221 to open, and controls the transfer device 42 to move the holder 41 upwards out of the recycling space 310 to perform the cooling step 84. Then, the plate-like objects 901 are obtained by the recycling process of the laminar structures 900. Taking the recycling of laminar structures 900 such as solar cell modules as an example, independently separated glass covers, back-plates and photovoltaic panels will be obtained as the recycled plate-like objects 901.

After the recycling method of the present invention pyrolyzes the adhesives in the laminar structures through the molten salt, the molten salt in the barrel will first be discharged to a predetermined low liquid-level, and then the cover of the barrel will be opened. Then the holder carrying the separated plate-like objects is moved upward out of the barrel. This design can not only reduce the hot air escaping upward from the molten salt, but also reduce the resistance when moving the holder and the plate-like objects upwards out of the barrel, and also significantly reduce the amount of molten salt adhering on the holder and the plate-like objects. When moving the holder out of the barrel, such design can reduce the situation that the molten salt still attached on the surface of the plate-like objects will cool down, solidify and adhere thereon when encountering the relatively low-temperature air outside. It can improve the yield and efficiency of subsequent processing of recycled separated plate-like objects.

Figure 12:
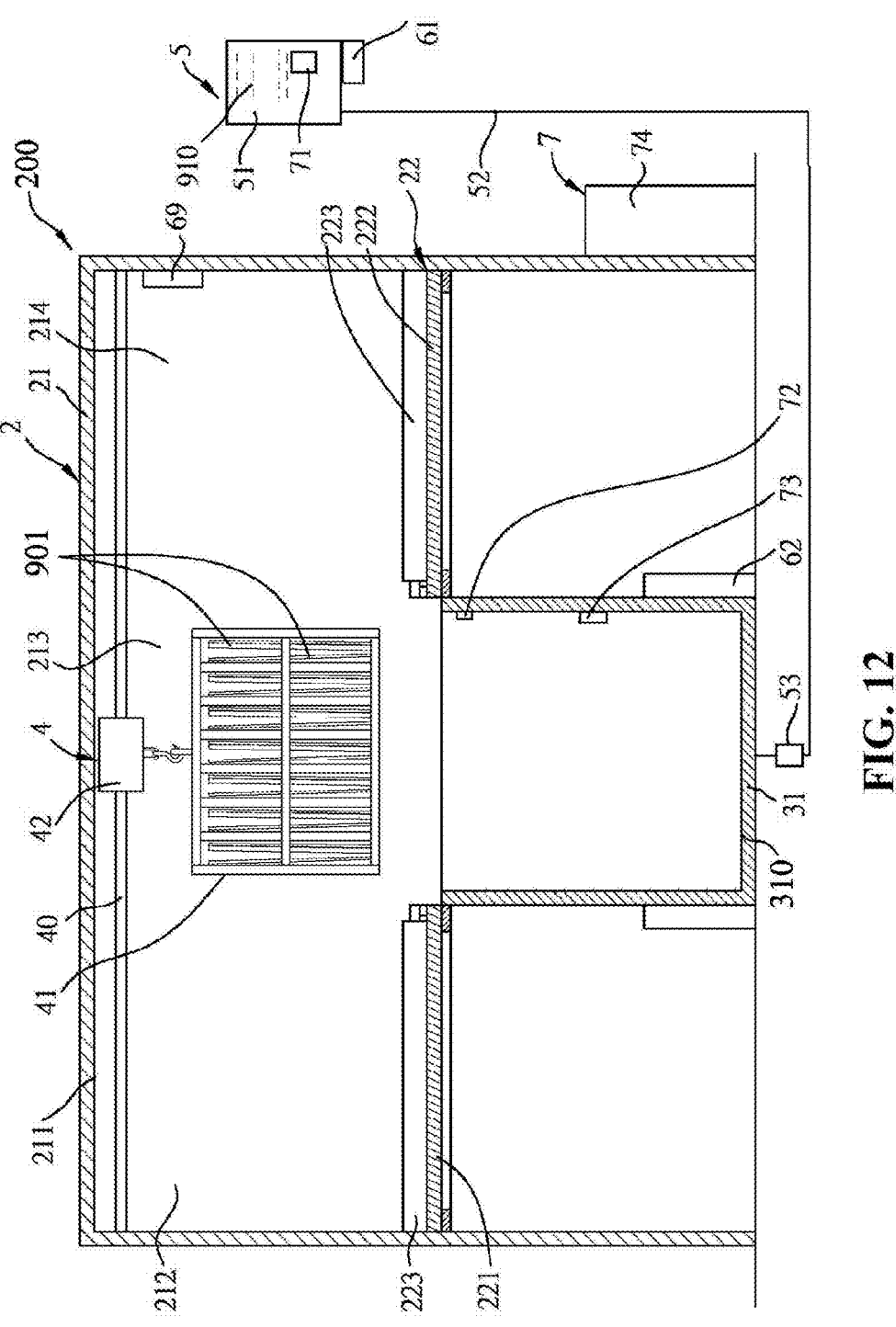
FIG. 12 is a view similar to FIG. 7, illustrating the situation when the holder containing the plate-like objects obtained by recycling processing the laminar structures is moved upward out of the recycling space.

Step 84: cooling. Referring to FIGS. 4, 6, and 12, after completing the recycling processing of step 83, the controller 74 starts the cooling procedure. The controller 74 controls the transfer device 42 to move the holder 41 upward into the second temperature-adjusting zone 213, that is, to move the recycled plate-like products upward out of the recycling space 310, and stay in the second temperature-adjusting zone 213 for a first cooling time. During the first cooling time, the remaining liquid molten salt 910 still attached to the recycled product (plate-like objects 901) can drip down into the recycling space 310; in addition, the plate-like objects 901 are gradually cooled to an ambient temperature close to the second temperature-adjusting zone 213.

Figure 13:
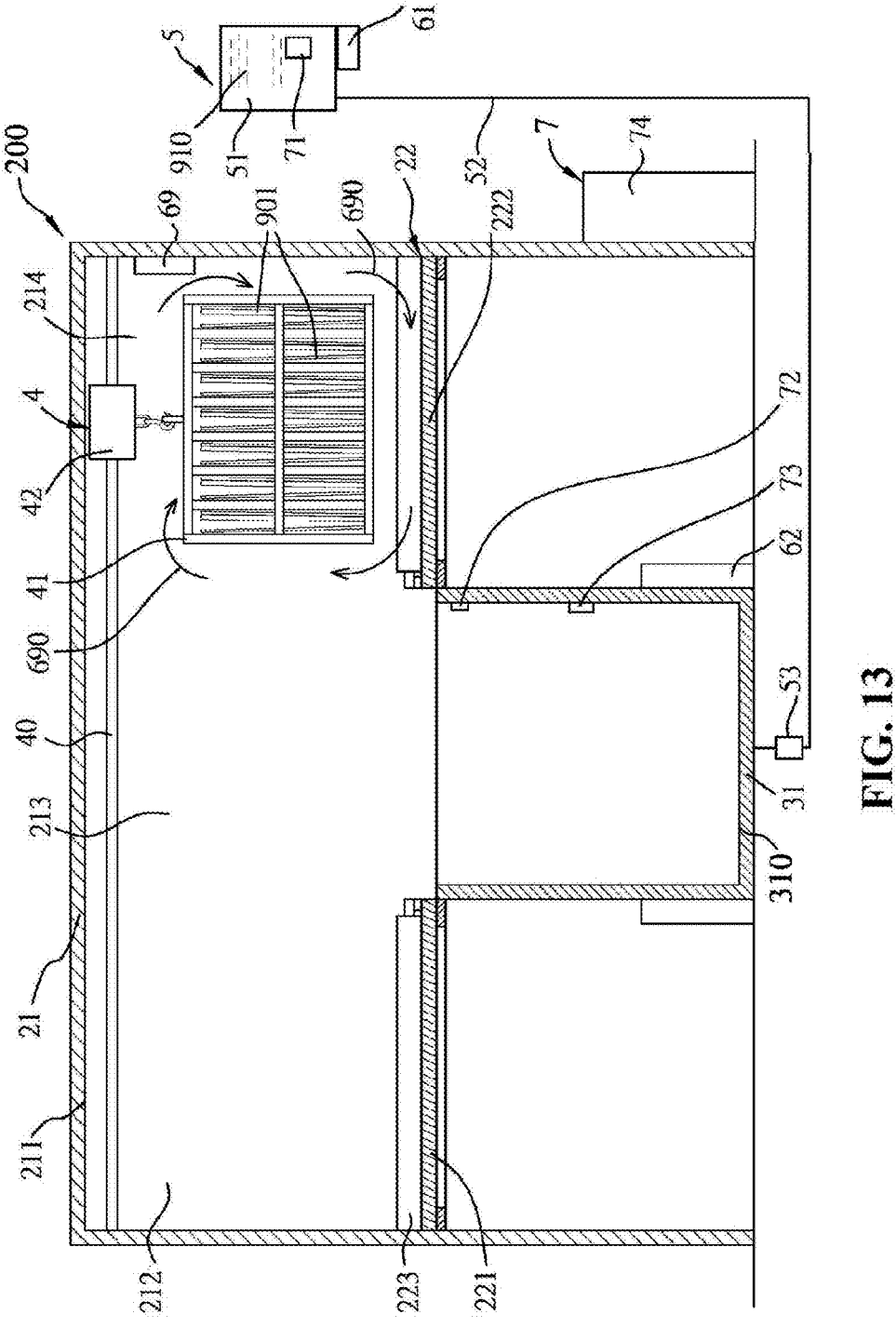
FIG. 13 is a view similar to FIG. 7, illustrating the situation when the holder is moved to the third temperature-adjusting zone and a cooling device is driven to generate cooling airflow.

Referring to FIGS. 6, 13, and 14, then, the controller 74 controls the transfer device 42 to move the holder 41 laterally to the third temperature-adjusting zone 214 and stay there for a second cooling time. At the same time, the controller 74 also controls the cooling device 69 to generate the cooling airflow 690 in the third temperature-adjusting zone 214 to increase the cooling speed of the recycled products in the holder 41.

Then, the controller 74 controls the door-unit 22 to switch to the third position. Such that, the second door 222 seals the recycling space 310 from the second temperature-adjusting zone 213 to prevent the heat energy in the recycling space 310 from spreading outward to the temperature-adjusting space 211, and the third temperature-adjusting zone 214 connects with the outside world. The controller 74 keeps controlling the transfer device 42 to keep the holder 41 in the third temperature-adjusting zone 214 for a third cooling time, and keeps controlling the cooling device 69 to generate the cooling airflow 690, so as to further increase the cooling speed of the recycled products in the holder 41 and make the temperature of the recycled products closer to the external ambient temperature.

Step 85: unloading. Referring to FIGs. 4, 6, and 15, after completing the cooling step 84, the controller 74 controls the transfer device 42 to move the holder 41 downward out of the third temperature-adjusting zone 214, thus completing the recycling process. Then, the plate-like objects 901 obtained by recycling can be taken out from the holder 41.

During moving the laminar structures 900 into the recycling space 310 from the outside world, and during moving the laminar structures 900 out from the recycling space 310 to the outside world after the recycling process, through the control of the transfer device 42, the recycling device and recycling method of the present invention can allow the laminar structures 900 to stay in the first temperature-adjusting zone 212, the second temperature-adjusting zone 213, and/or the third temperature-adjusting zone 214 respectively for a predetermined time, so as to reduce the temperature difference between the temperature of the laminar structures 900 and the operating temperatures required for each recycling process. Not only the efficiency of the recycling process can be improved, but also the situations of broken layered objects 901 and poor recycling results due to severe temperature differences can be minimized.

In this embodiment, the transfer device 42 can lift the holder 41 up and down between the first temperature-adjusting zone 212 and the outside world, and to lift the holder 41 up and down between the third temperature-adjusting zone 214 and the outside world. However, in another embodiment of the present invention, the first temperature-adjusting zone 212 and the third temperature-adjusting zone 214 can be designed to be laterally connected to the outside world, and the transfer device 42 can be designed to move the holder 41 laterally between the outside world and the first temperature-adjusting zone 212, and between the third temperature-adjusting zone 214 and the outside world.

Figure 16:
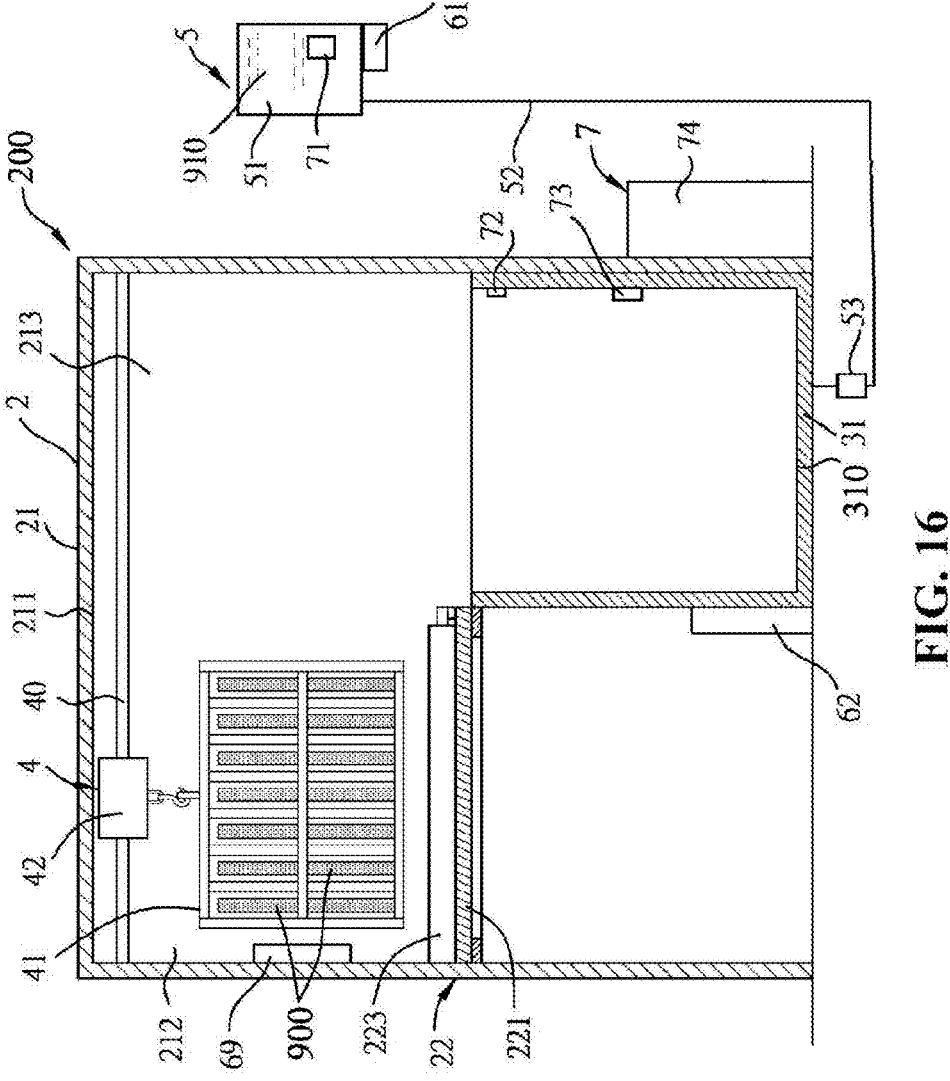
FIG. 16 is a side cross-sectional view schematically illustrating the structure of a third embodiment of a recycling device for laminar structures bonded by cured adhesive of the present invention.

Referring to FIG. 16, the differences between a third embodiment of the recycling device 200 and the second embodiment include: the structural design of the housing equipment 2, the cooling device 69, and the transfer equipment 4, and the steps of the recycling method corresponding to these differences. For convenience of explanation, only the differences between these embodiments will be described below.

In this third embodiment, the temperature-adjusting space 211 only includes the first temperature-adjusting zone 212 and the second temperature-adjusting zone 213 connected with each other. The transfer device 42 can transfer the holder 41 between the outside world, the first temperature-adjusting zone 212, the second temperature-adjusting zone 213 and the recycling space 310. The cooling device 69 is furnished in the first temperature-adjusting zone 212.

The door-unit 22 only includes the first door 221, and the door-unit 22 can be controlled to switch between the first position and the second position. When the door-unit 22 is in the first position, the first temperature-adjusting zone 212 is connected to the outside world, and the first door 221 seals and separates the second temperature-adjusting zone 213 from the recycling space 310. When the door-unit 22 is in the second position, the first door 221 will seal the first temperature-adjusting zone 212 from the outside world, so that the second temperature-adjusting zone 213 is connected to the recycling space 310.

Referring to FIGS. 4, 6, and 16, the differences between the recycling method of the recycling device 200 of the third embodiment and the second embodiment are explained as follows.

In the medium heating step 812 of the preparing heat treatment medium step 81, the controller 74 will execute the medium heating procedure, control the door-unit 22 to be in the second position, and control the first and second devices 61, 62 to heat the molten salt 910 contained in the molten salt container 51 and/or the recycling space 310.

In the preheating step 82, the controller 74 will execute the preheating procedure, control the door-unit 22 to switch to the first position, control the transfer device 42 to move the holder 41 into the first temperature-adjusting zone 212, and then control the door-unit 22 to switch to the second position again. The controller 74 will control the transfer device 42 to keep the holder 41 in the first temperature-adjusting zone 212 and stay for the preliminary preheating time. The, the controller 74 will control the transfer device 42 to move the holder 41 into the second temperature-adjusting zone 213 and keep the holder 41 staying in the second temperature-adjusting zone 213 for the high-temperature preheating time.

In the recycling processing step 83, the controller 74 will execute the recycling processing procedure and control the transfer device 42 to move the holder 41 into the empty recycling space 310, start filling molten salt until the molten salt liquid-level completely covers the top of the laminar structures 900, and keep the holder 41 to stay in the recycling space 310 for the predetermined processing time. Then, the molten salt 910 will contact and gradually pyrolyze the cured adhesives of the laminar structures 900 in the holder 41.

In the cooling step 84, the controller 74 will execute the cooling procedure. The controller 74 will pump the molten salt 910 in the recycling space 310 back to the molten salt container 51 until the remaining molten salt 910 in the recycling space 310 will not soak to the bottom of the laminar structures 900. Then, the controller 74 controls the transfer device 42 to move the holder 41 from the recycling space 310 where the molten salt has been emptied to the second temperature-adjusting zone 213. The holder 41 stays in the second temperature-adjusting zone 213 for the first cooling time to initially cool down the recycled plate-like objects (not shown) in the holder 41. Then, the controller 74 controls the transfer device 42 to move the holder 41 to the first temperature-adjusting zone 212 so that the holder 41 stays in the first temperature-adjusting zone 212 for the second cooling time. Meanwhile, the controller 74 controls the cooling device 69 to generate the cooling airflow 690 to accelerate the cooling of the plate-like objects in the holder 41. Then, the controller 74 controls the door-unit 22 to switch to the first position, so that the first temperature-adjusting zone 212 is connected to the outside world, and the holder 41 keeps staying in the first temperature-adjusting zone 212 for the third cooling time. Meanwhile, the controller 74 controls the cooling device 69 to keep generating the cooling airflow 690 to further accelerate the cooling of the plate-like objects.

In the unloading step 85, the controller 74 controls the transfer device 42 to move the holder 41 out of the first temperature-adjusting zone 212 to complete the recycling processing procedure.

Through the structural design of the housing equipment 2, the cooling device 69 and the transfer equipment 4, and the control function design of the control equipment 7, the recycling device and recycling method of this third embodiment can still recycle the laminar structures 910 by using the molten salt 910, but the volume of the recycling device can be reduced.

Figure 17:
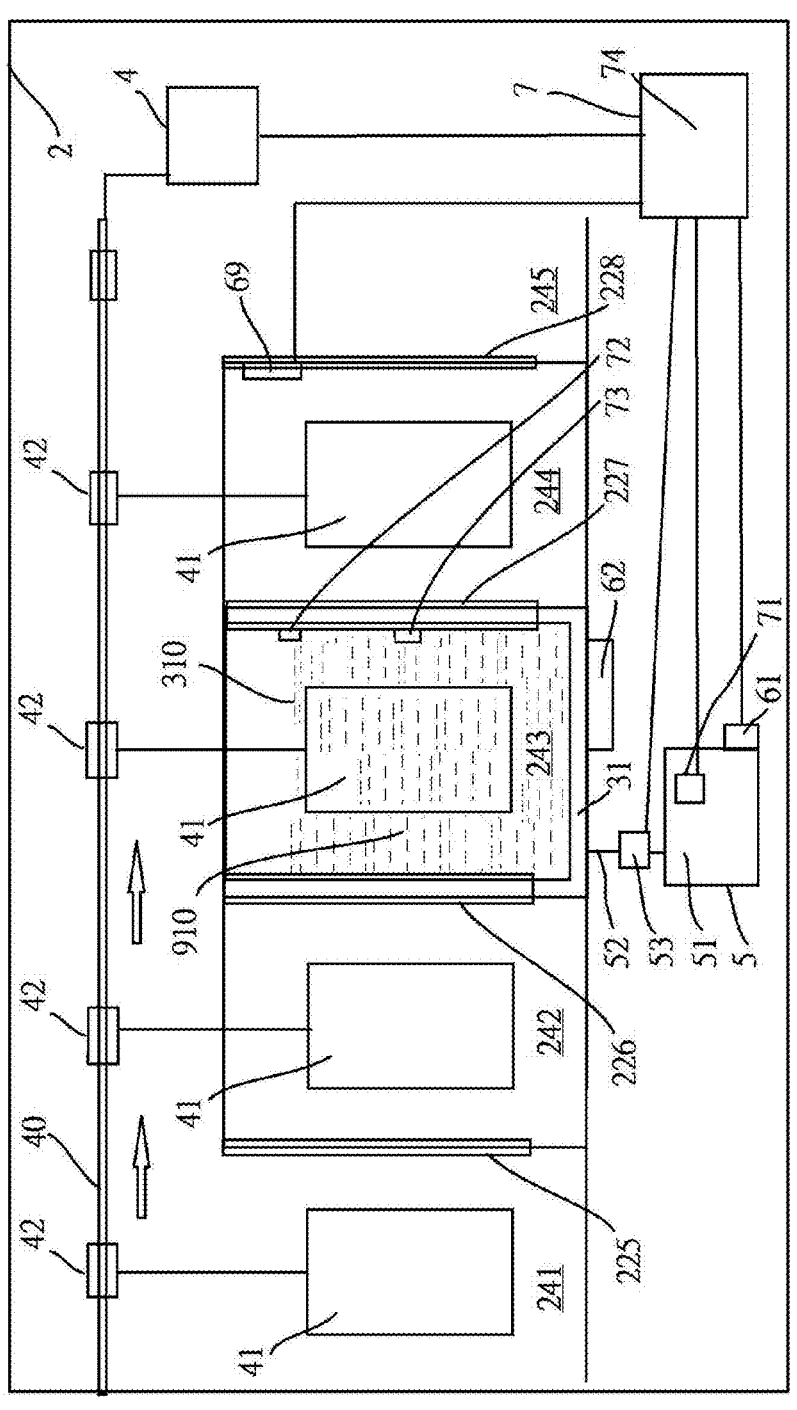
FIG. 17 is a schematic diagram illustrating a fourth embodiment of a recycling device for laminar structures bonded by cured adhesive of the present invention.

FIG. 17 is a schematic diagram illustrating a fourth embodiment of a recycling device for laminar structures bonded by cured adhesive of the present invention. In the fourth embodiment, the machine structure of the recycling device is designed to be lateral, and the transfer equipment only needs to move laterally without lifting vertically. The recycling device also comprises: a barrel device having a barrel 31, a molten salt supply equipment 5 connecting with the barrel 31 and containing the molten salt 910, a first heating device 61 provided in the molten salt supply equipment 5, a second heating device 62 provided in the barrel 31, a cooling device 69, a transfer equipment 4, and a control equipment 7. The control equipment 7 is electrically connected with the housing equipment 2, the barrel device, the molten salt supply equipment 5, the first heating device 61, the second heating device 62, the cooling device 69 and the transfer equipment 4. The molten salt supply equipment 5 includes: a molten salt container 51 and a pumping equipment 53 (including a piping system 52). The control equipment 7 includes a first temperature sensor 71, a liquid-level sensor 72, a second temperature sensor 73, and a controller 74. Since the structures, connection relationships and functions of the above-mentioned components of the fourth embodiment of the recycling device are the same as those of the first embodiment, their details will not be described again.

In the fourth embodiment shown in FIG. 17, the housing equipment 2 of the recycling device includes five zones arranged laterally, which are in order the loading zone 241, the preheating zone 242, the barrel zone 243, the cooling zone 244, and the unloading zone 245. There are switchable gates 225, 226, 227, 228 between each zone. In particular, the two gates 226 and 227 located in the barrel zone 243 are sealing gates that can prevent liquid leakage.

The loading zone 241 connects to the outside world, and the temperature of the loading zone 241 is generally similar to the outside temperature, generally between 10~50° C. The holder 41 in which the laminar structures 900 are placed is transferred to the loading zone 241 by the transfer device 42 on the rail unit 40 at ambient temperature. Then, the first gate 225 located between the loading zone 241 and the preheating zone 242 is opened, and the transfer device 42 transfers the holder 41 and the laminar structures 900 into the preheating zone 242, and then close the first gate 225. Because the preheating zone 242 is adjacent to the barrel zone 245, the temperature of the preheating zone 242 will be heated to between 100~200° C. due to the high temperature of the barrel 31 in the barrel zone 245. The holder 41 and the laminar structures 900 stay in the preheating zone 242 for ten minutes to one hour, so that the temperatures of the holder 41 and the laminar structures 900 are also preheated to 100~200° C. At this time, the barrel 31 in the barrel zone 243 is empty, molten salt has not been injected, and the temperature of the barrel 31 is maintained at the high temperature of 200~550° C. by the second heating device 62. Then, the second gate 226 located between the preheating zone 242 and the barrel zone 243 is opened, and the transfer device 42 transfers the holder 41 and the laminar structures 900 into the empty barrel 31 in the barrel zone 243, and then the second gate 226 is closed. Meanwhile, the third gate 227 located between the barrel zone 243 and the cooling zone 244 is also closed. Then, start to fill the 200~550° C. high-temperature liquid molten salt 910 from the molten salt container 51 into the barrel 31 in the barrel zone 243 until the molten salt 910 completely submerges the top of the laminar structures 900. The holder 41 and the laminar structures 900 are submerged in the molten salt 910 of the barrel 31 in the barrel zone 243 and stay there for ten minutes to one hour. And, the second heating device 62 maintains the temperature of the molten salt 910 in the barrel 31 at a high temperature of 300~550° C., so that the adhesives of the laminar structures 900 are pyrolyzed and the plate-like objects are separated. Then, the molten salt 910 in the barrel 31 is pumped back to the molten salt container 51 until the barrel 31 is emptied. Then, the third gate 227 is opened, and the transfer device 42 transfers the holder 41 and the plate-like objects into the cooling zone 244. Then the third gate 227 is closed, and the cooling device 69 starts to cool the temperature of the holder 41 and the plate-like objects located in the cooling zone 244 for ten minutes to one hour. After the temperature of the holder 41 and the plate-like objects drops below 200° C., the fourth gate 228 between the cooling zone 244 and the unloading zone 245 is opened, and the transfer device 42 moves the holder 41 and the plate-like objects laterally to the outside world for unloading.

In the fourth embodiment, the rail unit 40 may include a loop track on which a plurality of transfer devices 42 are disposed. Each transfer device 42 connects and transfers a set of holder 41 and laminar structures 900 respectively. The recycling process adopts continuous batch operation. For example, when a certain set of holder 41 and laminar structures 900 is located in the barrel zone 243 for pyrolyzing operation, the previous set of holder 41 and laminar structures 900 that has completed the pyrolyzing operation is located in the cooling zone 244 for cooling operation, and at the same time, the latter set of holder 41 and laminar structures 900 is located in the preheating zone 242 for preheating operation. This not only greatly improves the recycling efficiency of the recycling method of the present invention, but also the transfer device 42 does not need to lift the holder 41 up and down, so the mechanism is simpler and easier to maintain.

In another embodiment not shown in the figures, the barrel 31 is a double-layer design. The inner space of the barrel 31 is a recycling space for accommodating the holder 41 and the laminar structures 900. An interlayer space is provided in the barrel wall for molten salt injection. The barrel wall of the barrel 31 has an interlayer space for accommodating molten salt. When the temperature of the inner recycling space reaches about 150-200° C., the liquid molten salt is injected into the interlayer space. At this time, the holder 41 and the laminar structures 900 are not in direct contact with the molten salt. The high temperature of the molten salt causes the temperature in the interlayer space and the barrel wall of the barrel 31 to rise to between 200-550° C., thereby performing high-temperature pyrolyzing to the adhesives of the laminar structures 900 located in the inner recycling space.

In yet another embodiment not shown in the figures, the holder is a sealed design. The laminar structures are completely sealed by the holder and then submerged in high-temperature molten salt, so that the laminar structures have no direct contact with the molten salt, and only high temperature of 200-550° C. is used to pyrolyze the laminar structures located in the inner recycling space.

In summary, the recycling device and recycling method of the present invention utilize the novel designs of barrel device 3, molten salt container 5, recycling space 310, temperature-adjusting space 211, door-unit 22, transfer equipment 4, and control equipment 7 to perform recycling process, and to use the molten salt 910 to pyrolyze the cured adhesives 902 in the laminar structures 900. Thereby, the plate-like objects 901 adhered by the adhesives 902 can be separated as integral and plate-like structures. When used for recycling of solar cell modules, the complete structures of the glass covers, the back-plates and the photovoltaic panels can be obtained, so it can indeed improve the shortcomings of existing recycling methods such as direct heating pyrolysis, mechanical peeling or scraping.

While the present invention has been particularly shown and described with reference to a preferred embodiment, it will be understood by those skilled in the art that various changes in form and detail may be without departing from the spirit and scope of the present invention.

What is claimed is:

1. A recycling device for laminar structures bonded by cured adhesive, comprising:
  a holder, configured to accommodate a plurality of laminar structures;
  a barrel, having a recycling space for accommodating the holder;
  a molten salt container, for containing a molten salt;
  a first heating device, connecting with the molten salt container for heating the molten salt contained in the molten salt container;
  a pumping equipment, connecting with the molten salt container and the barrel, for injecting the molten salt contained in the molten salt container into the recycling space of the barrel, and pumping the molten salt contained in the recycling space back to the molten salt container;
  a second heating device, connecting with the barrel, for heating the molten salt contained in the recycling space of the barrel;
  a transfer device, for transferring the holder together with the laminar structures into or out of the recycling space of the barrel; and
  a control equipment, electrically connecting with the first heating device, the pumping equipment, the second heating device and the transfer device;
  wherein the control equipment provides a plurality of control functions comprising:
    controlling the first heating device to heat and melt the molten salt contained in the molten salt container;
    controlling the transfer device to move the holder together with the laminar structures into the recycling space when a liquid-level of the molten salt in the recycling space of the barrel is lower than a predetermined low liquid-level;
    when the holder and the laminar structures are already in the recycling space, controlling the pumping equipment to inject the molten salt contained in the molten salt container into the recycling space until the liquid-level of the molten salt contained in the recycling space of the barrel reaches a predetermined high liquid-level;
    controlling the second heating device to heat and maintain the molten salt in the recycling space of the barrel at a predetermined processing temperature;

when the liquid-level of the molten salt injected into the recycling space reaches the predetermined high liquid-level, the control equipment starts timing a predetermined processing time, and after the predetermined processing time ends, the control equipment controls the pumping equipment to pump the molten salt in the recycling space back to the molten salt container when the holder and the laminar structures are still located in the recycling space, until the liquid-level of the molten salt in the recycling space is lower than the predetermined low liquid-level; and
    when the predetermined processing time ends and the liquid-level of the molten salt in the recycling space is lower than the predetermined low liquid-level, the control equipment controls the transfer device to move the holder together with the laminar structures out of the recycling space of the barrel;
  wherein, the predetermined low liquid-level is lower than bottoms of the laminar structures accommodated in the recycling space of the barrel; the predetermined high liquid-level is higher than tops of the laminar structures accommodated in the recycling space of the barrel.

2. The recycling device of claim 1, further comprising a housing equipment and a cooling device; wherein:
  the housing equipment includes a housing and a door-unit installed in the housing; the housing defines a temperature-adjusting space which is connectable with the recycling space; the door-unit is controlled by the control equipment to switch between a first position for connecting the temperature-adjusting space to the outside world and closing the recycling space, and a second position for separating the temperature-adjusting space from the outside world and connecting the temperature-adjusting space with the recycling space;
  the temperature-adjusting space includes a first temperature-adjusting zone connectable to the outside world, and a second temperature-adjusting zone connectable to both the first temperature-adjusting zone and the recycling space; the door-unit includes a first door; when the door-unit is in the first position, the first door closes the second temperature-adjusting zone and the recycling space, and allows the first temperature-adjusting zone to communicate with the outside world; when the door-unit is in the second position, the first door blocks the first temperature-adjusting zone from the outside world, and connects the second temperature-adjusting zone with the recycling space;
  when the control equipment performs a recycling function, a preheating procedure, a recycling processing procedure and a cooling procedure will be executed; when the control equipment executes the preheating procedure, the control equipment firstly controls the transfer device to move the holder from the outside world into the first temperature-adjusting zone, then controls the door-unit to switch to the second position, then counts for a preliminary preheating time, then controls the transfer device to move the holder into the second temperature-adjusting zone, and then counts for a high-temperature preheating time; when the control equipment executes the recycling processing procedure, the control equipment controls the transfer device to move the holder into the recycling space; when the control equipment executes the cooling procedure, the control equipment controls the transfer device to move the holder from the recycling space into the second temperature-adjusting zone and stay there for a first cooling time, then controls the transfer device to move the holder into the first temperature-adjusting zone and stay there for a second cooling time, then controls the door-unit to switch to the first position, and then controls the transfer device to move the holder out of the first temperature-adjusting zone;

the cooling device is installed in the housing and is electrically connected with and controllable by the control equipment; when executing the cooling procedure, the control equipment controls the transfer device to move the holder into the first temperature-adjusting zone during the second cooling time, and also controls the cooling device to generate a cooling airflow in the first temperature-adjusting zone.

3. The recycling device of claim 1, further comprising a housing equipment and a cooling device; wherein:

the housing equipment includes a housing and a door-unit installed in the housing; the housing defines a temperature-adjusting space which is connectable with the recycling space; the door-unit is controlled by the control equipment to switch between a first position for connecting the temperature-adjusting space to the outside world and closing the recycling space, and a second position for separating the temperature-adjusting space from the outside world and connecting temperature-adjusting space with the recycling space;

the temperature-adjusting space includes: a first temperature-adjusting zone connectable to the outside world, a third temperature-adjusting zone connectable to the outside world, and a second temperature-adjusting zone connectable to the first temperature-adjusting zone, the third temperature-adjusting zone and the recycling space; the door-unit can be controlled to switch between the first position, the second position and a third position; when the door-unit is in the first position, the door-unit connects the first temperature-adjusting zone to the outside world, and separates the recycling space from the second temperature-adjusting zone, and also separates the third temperature-adjusting zone from the outside world; when the door-unit is in the second position, the door-unit connects the recycling space to the second temperature-adjusting zone, and separates the first temperature-adjusting zone from the outside world, and also separates the third temperature-adjusting zone from the outside world; when the door-unit is in the third position, the door-unit connects the third temperature-adjusting zone to the outside world, and separates the recycling space from the second temperature-adjusting zone, and also separates the first temperature-adjusting zone from the outside world;

when the control equipment performs a recycling function, a preheating procedure, a recycling processing procedure and a cooling procedure will be executed; when the control equipment executes the preheating procedure, the control equipment firstly controls the transfer device to move the holder from the outside world into the first temperature-adjusting zone, then controls the door-unit to switch to the second position, then counts for a preliminary preheating time, then controls the transfer device to move the holder into the second temperature-adjusting zone, and then counts for a high-temperature preheating time; when the control equipment executes the recycling processing procedure, the control equipment controls the transfer device to move the holder into the recycling space; when the control equipment executes the cooling procedure, the control equipment controls the transfer device to move the holder from the recycling space into the second temperature-adjusting zone and stay there for a first cooling time, then controls the transfer device to move the holder into the third temperature-adjusting zone and stay there for a second cooling time, then controls the door-unit to switch to the third position, and then controls the transfer device to move the holder out of the third temperature-adjusting zone;

the cooling device is installed in the housing and is electrically connected with and controllable by the control equipment; when executing the cooling procedure, the control equipment controls the transfer device to move the holder into the third temperature-adjusting zone during the second cooling time, and also controls the cooling device to generate a cooling airflow in the third temperature-adjusting zone;

the temperature of the first temperature-adjusting zone is maintained between 100~200° C., the temperature of the second temperature-adjusting zone is maintained between 200~350° C., the temperature of the third temperature-adjusting zone is below 200° C., and temperature of the molten salt in the barrel is maintained between 300~550° C. by the second heating device.

4. The recycling device of claim 3, wherein, the control equipment includes a liquid-level sensor disposed in the barrel and a first temperature sensor disposed in the molten salt container;

the liquid-level sensor senses the liquid-level of the molten salt in the recycling space; during injecting the molten salt into the recycling space, the control equipment will stop injecting the molten salt when it determines that the liquid-level sensed by the liquid-level sensor has reached the predetermined high liquid-level; during the pumping equipment pumping the molten salt in the recycling space back to the molten salt container, the control equipment will control the pumping equipment to stop pumping when it determines that the liquid-level sensed by the liquid-level sensor has reached the predetermined low liquid-level;

the first temperature sensor senses the temperature of the molten salt in the molten salt container; during the control equipment executing the recycling processing procedure, the control equipment will control the pumping equipment to inject the molten salt contained in the molten salt container into the recycling space od the barrel when it determines that the temperature sensed by the first temperature sensor has reached a predetermined melting temperature.

5. The recycling device of claim 4, wherein, the molten salt is prepared by adding an additional pure potassium element to a potassium nitrate molten salt, so that a weight percentage of potassium in the prepared molten salt is higher than that in pure potassium nitrate molten salt; an added amount of the additional pure potassium element is ranged from 5% to 15% based on the weight percentage of the potassium nitrate molten salt, such that the proportion of potassium in the prepared molten salt ranges from 41.6% to 46.68%.

6. A recycling method for laminar structures bonded by cured adhesive, comprising:

a step for preparing heat treatment medium; preparing a molten salt with potassium nitrate as main ingredient, then containing the prepared molten salt in a molten salt container, and then using a first heating device to heat the molten salt in the molten salt container to a predetermined melting temperature to make the molten salt melted;

a step for preheating; using a control equipment to control a transfer device to move a holder containing a plurality of laminar structures into a temperature-adjusting space for preheating treatment to reduce the temperature difference between the laminar structures and the molten salt;

a step for recycling processing, further comprising the following steps:

a step for positioning laminar structures; the control equipment controlling the transfer device to move the holder together with the laminar structures into a recycling space of a barrel after the preheating step; at this time, the liquid-level of the molten salt in the barrel is not high enough to soak into a bottom of the laminar structures;

a step for filling molten salt; the control equipment controlling a piping system of a pumping equipment to inject the molten salt that has been heated to the predetermined melting temperature from the molten salt container into the recycling space of the barrel, until the liquid-level of the molten salt completely submerges a top of the laminar structures; then, the control equipment controlling a second heating device to heat and maintain the molten salt in the recycling space at a predetermined processing temperature;

a step for molten salt pyrolyzing; the laminar structures being submerged in the molten salt in the recycling space, and allowing an adhesive in the laminar structures to contact the molten salt for a predetermined processing time; such that a plurality of plate-like objects bonded by the adhesive in the laminar structures can be separated to obtained a plurality of recycled products; and a step for outputting recycled objects; after the predetermined processing time is over, the control equipment controlling the pumping equipment to pump the molten salt in the recycling space back to the molten salt container, until the liquid-level of the molten salt in the recycling space is lower than the bottom of the laminar structures;

a step for cooling; after the predetermined processing time is over and the liquid-level of the molten salt in the recycling space is lower than the bottom of the laminar structures, the control equipment controlling the transfer device to move the holder together with the recycled products from the recycling space to the temperature-adjusting space for cooling; and a step for unloading; after the cooling step completes, the control equipment controlling the transfer device to move the recycled products out of the temperature-adjusting space.

7. The recycling method of claim 6, wherein, the temperature-adjusting space includes a first temperature-adjusting zone and a second temperature-adjusting zone connectable with the recycling space and the first temperature-adjusting zone; in the preheating step, the transfer device moves the laminar structures into the first temperature-adjusting zone and stays there for a preliminary preheating time, then the transfer device moves the laminar structures into the second temperature-adjusting zone and stays there for a high-temperature preheating time, and then performing the recycling processing step.

8. The recycling method of claim 7, wherein, in the cooling step, the transfer device moves the recycled products into the second temperature-adjusting zone and stays there for a first cooling time, then the transfer device moves the recycled products into the first temperature-adjusting zone and stays there for a second cooling time, and then performing the unloading step; wherein, during the second cooling time, a cooling device generates a cooling airflow flowing through the recycled products in the first temperature-adjusting zone.

9. The recycling method of claim 7, wherein, the temperature-adjusting space further includes a third temperature-adjusting zone; the second temperature-adjusting zone is connected between the first temperature-adjusting zone, the third temperature-adjusting zone and the recycling space; in the cooling step, the transfer device moves the recycled products into the second temperature-adjusting zone and stays there for a first cooling time, then the transfer device moves the recycled products into the third temperature-adjusting zone and stays there for a second cooling time, and then performing the unloading step; wherein, during the second cooling time, a cooling device generates a cooling airflow flowing through the recycled products in the third temperature-adjusting zone; wherein, the temperature of the first temperature-adjusting zone is maintained between 100~200° C., the temperature of the second temperature-adjusting zone is maintained between 200~350° C., the temperature of the third temperature-adjusting zone is below 200° C., and temperature of the molten salt in the barrel is maintained between 300~550° C. by the second heating device.

10. The recycling method of claim 9, wherein, in the step for preparing heat treatment medium, the molten salt is prepared by adding an additional pure potassium element to a potassium nitrate molten salt, so that a weight percentage of potassium in the prepared molten salt is higher than that in pure potassium nitrate molten salt; an added amount of the additional pure potassium element is ranged from 5% to 15% based on the weight percentage of the potassium nitrate molten salt, such that the proportion of potassium in the prepared molten salt ranges from 41.6% to 46.68%.

* * * * *